(12) United States Patent
Pohl

(10) Patent No.: US 7,881,982 B1
(45) Date of Patent: *Feb. 1, 2011

(54) METHOD, MEDIUM, AND SYSTEM FOR RENTER PRE-QUALIFICATION, RENTAL FACILITATION, AND REGULATORY COMPLIANCE

(76) Inventor: Chris Pohl, 125 Heartwood Ct., Loveland, OH (US) 45140

( * ) Notice: Subject to any disclaimer, the term of this patent is extended or adjusted under 35 U.S.C. 154(b) by 0 days.

This patent is subject to a terminal disclaimer.

(21) Appl. No.: 12/622,168

(22) Filed: Nov. 19, 2009

(51) Int. Cl.
   *G06Q 30/00* (2006.01)
(52) U.S. Cl. .............. 705/26.1; 705/26.25; 705/26.41
(58) Field of Classification Search ............... 705/26, 705/27
   See application file for complete search history.

(56) References Cited

U.S. PATENT DOCUMENTS

| | | | |
|---|---|---|---|
| 2002/0023051 A1* | 2/2002 | Kunzle et al. | 705/38 |
| 2002/0147677 A1 | 10/2002 | Brady | |
| 2002/0169641 A1 | 11/2002 | Wallace, Jr. | |
| 2003/0093289 A1 | 5/2003 | Thornley et al. | |
| 2003/0225599 A1* | 12/2003 | Mueller et al. | 705/5 |
| 2004/0030640 A1* | 2/2004 | Mahnken et al. | 705/39 |
| 2006/0074705 A1* | 4/2006 | Carolan et al. | 705/1 |
| 2006/0184440 A1* | 8/2006 | Britti et al. | 705/35 |
| 2007/0022297 A1* | 1/2007 | Britti et al. | 713/182 |
| 2007/0038497 A1* | 2/2007 | Britti et al. | 705/8 |

OTHER PUBLICATIONS

"Need to Rent Your House?," The Seattle Times Aug. 9, 2009.*

* cited by examiner

*Primary Examiner*—Yogesh C Garg
*Assistant Examiner*—Matthew Zimmerman
(74) *Attorney, Agent, or Firm*—William S. Morriss; Frost Brown Todd LLC

(57) ABSTRACT

Consumers who are interested in various rental properties can create a list of those properties, and notifications of that interest can be sent to the property managers associated with those properties. A system could be implemented to send multiple notifications (e.g., to each manager of a property on the list) with a single request by the consumer. Such notifications can be used to provide property managers with information used to screen applicants, and/or can allow property managers to seek to access additional information about the consumer. Whether any additional information has been accessed can be tracked to verify that access is only provided in compliance with relevant regulation. This type of functionality can be integrated with a system that allows regulatory investigations to be allocated to, and performed by, compliance representatives using mobile devices, and can also be integrated with functionality that allows consumers to present themselves as pre-qualified applicants.

15 Claims, 25 Drawing Sheets

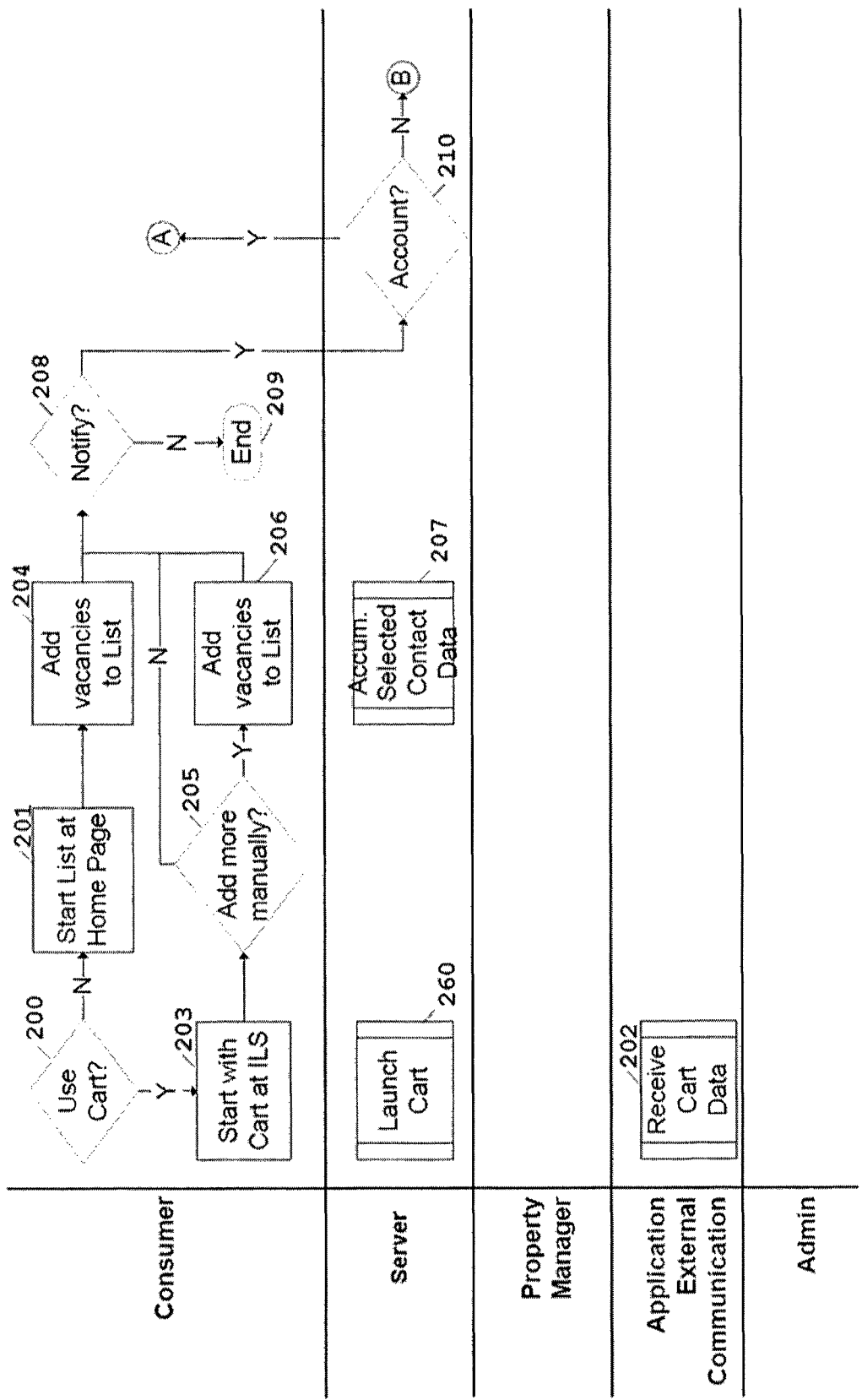

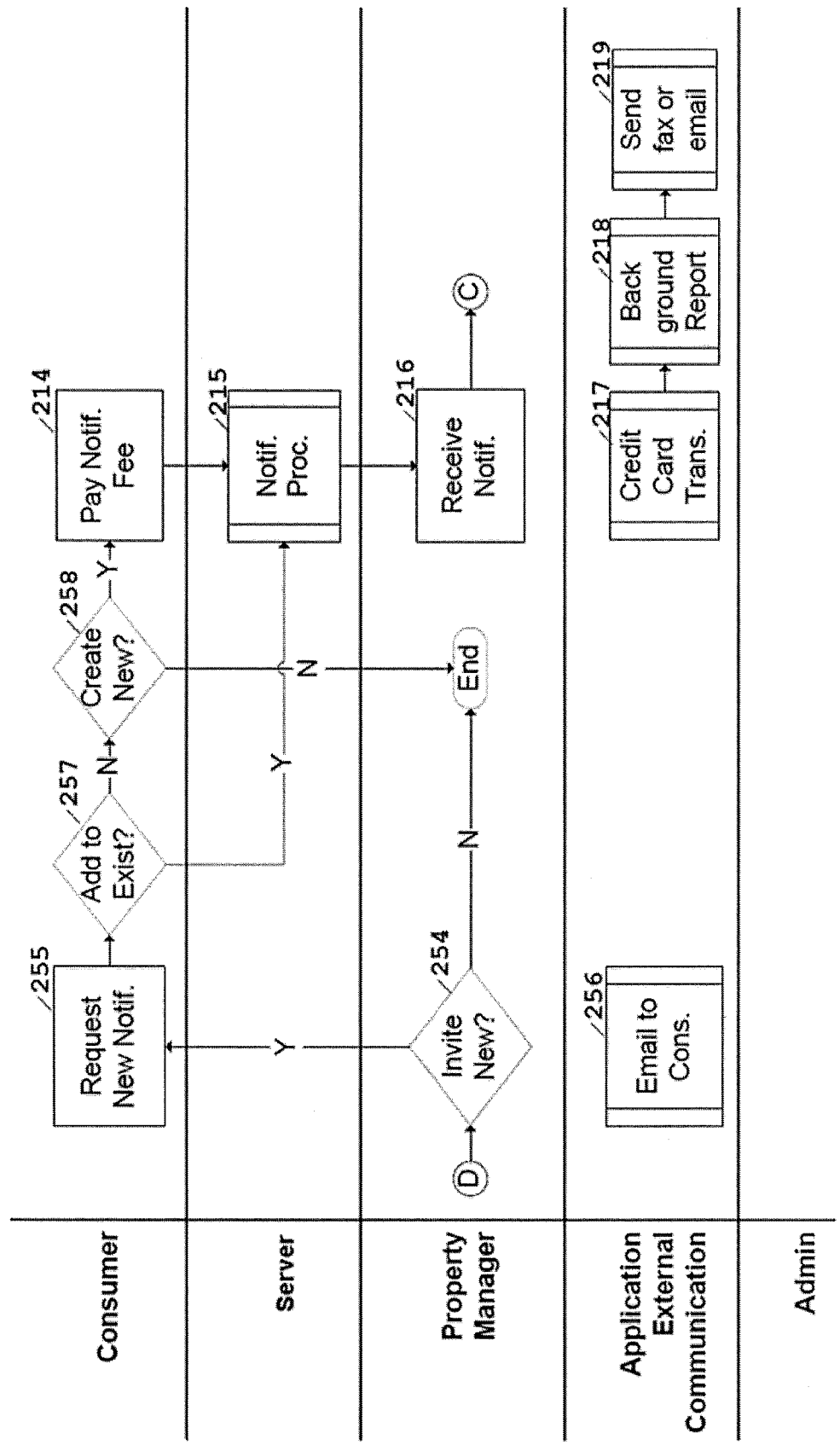

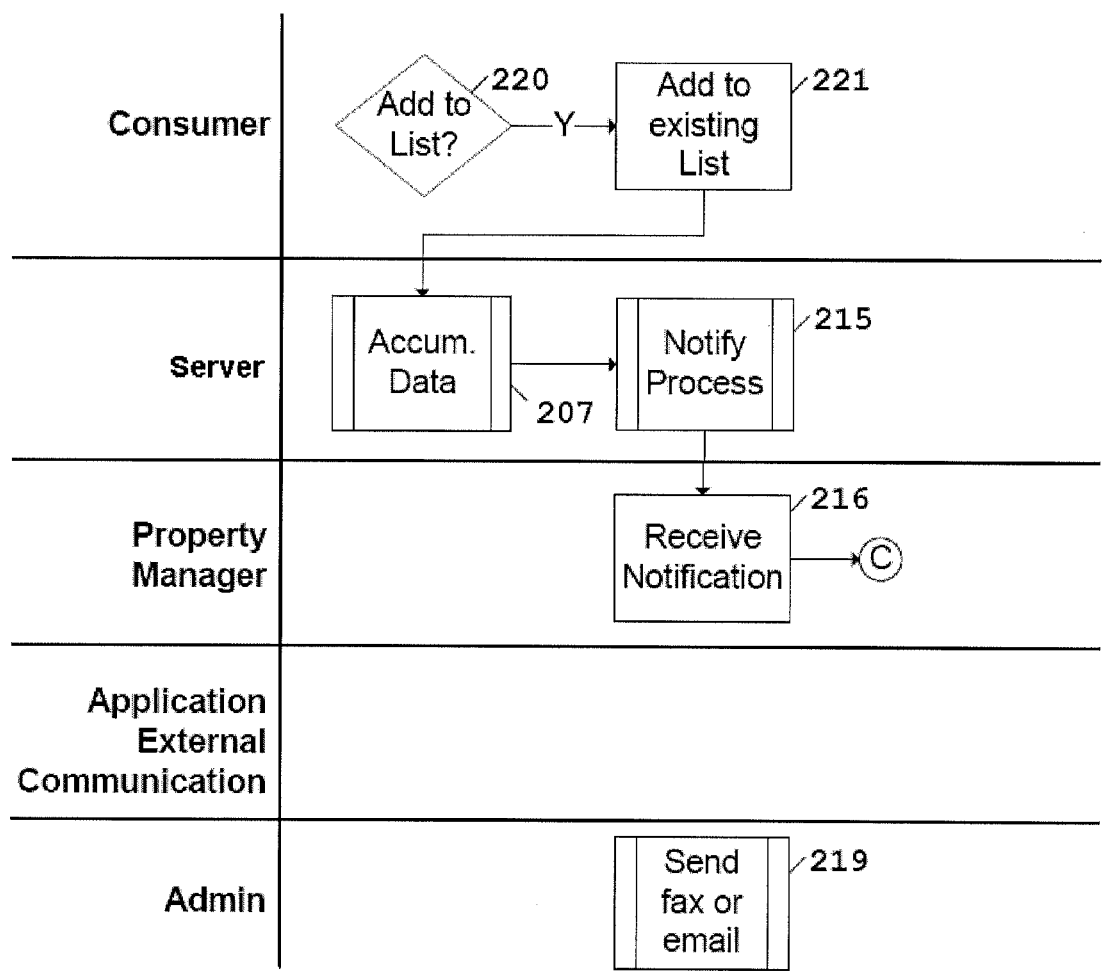

Figure 7

Logo

702 Login
Name: ↙ [    ]

Password: [    ]

[Enter]

Apartment Seekers

Start your rental search here. Notify multiple landlords and property managers of your interest in their vacancies with a single fee.

Enter the fax number or email address of the first property manager here to begin:

[    ] [Enter]

Property Managers

Did you receive a fax or email notifying you of a renter's interest in your vacancy? If so, enter the Consumer Code below to view begin the free screening process.

701 → [    ] [Enter]

Figure 11

*fsinatra@site.com*
*Total inspections: 382*
*Unpaid inspections: 13*

| Get Job | Set Preferences | Call Office |
|---|---|---|

1101 ↗

Current Job:

Dean Martin, 123 Main Street, Chicago
Call  Schedule

Scheduled Jobs:

2:30pm Johnny Cash, 345 Elm Street, Chicago  Call

4:45pm Mel Brooks, 765 Galena, Chicago Call

Figure 13

Logo

Notification List

Enter additional vacancies below. Click Done to proceed with the notification(s). You may return to add more vacancies later.

Provide either a fax number or email address for each vacancy. 1301

1 555-344-5555
2 555-886-5555
3             PM@PM.com
4             Bob@roof.com
5 555-991-5555
6

Add More        Done

Figure 14

ILS

Apartments for Rent 2 bed/2 bath, Winnetka    Notify 3 bed/2.5 bath, Reseda    Notify 2 bed/1.5 bath, Canoga    Notify

1401

US 7,881,982 B1

METHOD, MEDIUM, AND SYSTEM FOR RENTER PRE-QUALIFICATION, RENTAL FACILITATION, AND REGULATORY COMPLIANCE

FIELD

Aspects of this disclosure can be implemented in the field of renter pre-qualification, computerized rental agreements, and regulatory compliance verification.

RELATED ART

There exist conventional systems and methods which use computers and computer networks to facilitate the creation of rental agreements. These systems generally function as tools to allow consumers to obtain information about vacancies they may be interested in, and contact information for the property managers for those vacancies. The consumers are then expected to contact each property manager in the manner requested in the property's advertisement, complete a written or electronic application form and often pay a fee to start the application process. The property manager, on his or her part, purchases background information (e.g., credit report, eviction report, criminal report, etc.) to help evaluate the consumer.

There are a number of drawbacks to these conventional systems and methods. For example separately contacting landlords can result in unnecessary background checks for renters, which can hurt credit scores. Additionally, using current methods, there is generally a need for multiple redundant data entries, as well as multiple redundant visits for completing paperwork by both potential tenants and potential landlords. As a result, there is a long-felt, but unmet need for technology which can address one or more of the deficiencies with existing systems.

SUMMARY

The technology disclosed herein can be implemented in a variety of manners, including as systems or methods for pre-qualifying rental applicants, and/or notification of a pre-qualified lead to one or more property managers and owners over a computer network. In some cases, systems implemented according to this disclosure could allow a consumer to pre-qualify himself or herself as a renter, and/or to notify multiple managers of his or her interest in their rental vacancies. Additionally, as described in this disclosure, some such implementations could also include features which could confirm (or facilitate) compliance by the property managers with any regulations or restrictions might be implicated by the rental process. For example, a system could be implemented to only allow a single manager to view background information in a first come, first serve basis, while requiring other managers to contact the consumer and request subsequent transactions directed specifically to them. Similarly, other methods, machines, and articles of manufacture could also be implemented based on this disclosure by those of ordinary skill in the art without undue experimentation, and so the preceding summary, as well as the descriptions and drawings set forth herein should be understood as being illustrative only, and not limiting.

BRIEF DESCRIPTION OF THE DRAWINGS

The drawings and detailed description which follow are intended to be merely illustrative and are not intended to limit the scope of the invention as contemplated by the inventor.

FIGS. 3a-3h depict potential actions which might take place in the process of identifying vacancies of interest to a consumer, notifying the relevant property managers of that interest, and allowing at least one of the relevant property managers to view information on the consumer and to potentially invite the consumer to become a tenant.

FIG. 7 depicts an exemplary interface which could be used to log in to a system, and/or to enter codes in response to a consumer notification.

FIG. 11 depicts an interface which could be used by a field compliance representative responsible for FCRA compliance inspections.

FIG. 13 depicts an exemplary interface which could be used to display a Notification List.

FIG. 14 depicts an exemplary shopping cart interface that could be presented by an internet listing service.

DETAILED DESCRIPTION

Certain aspects of the technology disclosed herein can be implemented in systems and methods for the notification of a pre-qualified consumer to one or more property managers over a computer network, and in the confirmation of compliance by those managers with applicable regulations, such as the fair credit reporting act (FCRA). For example, using techniques such as described herein, a system could be implemented which would allow a consumer to select one or more vacancies of interest, pre-qualify themselves, then notify the property managers or owners, by email or fax, of their interest through a central system. Similarly, mobile applications and work assignment routines could be implemented which would facilitate establishing and confirming compliance with relevant regulations. Additionally, information provided to property managers could also be provided to the applicants themselves (e.g., as a printout) so that the applicants could use that information to present themselves as pre-qualified renters to other property managers, either inside, or outside the context of the system. After reading this description, it will become apparent to one skilled in the art how to implement the disclosed technology in various alternative embodiments and alternative applications. Although various applications of the inventor's technology are described herein, it should be understood that these embodiments are presented by way of example only, and not limitation. As such, this detailed description should not be construed to limit the scope or breadth of the present invention as set forth in the appended claims.

Figure 1:
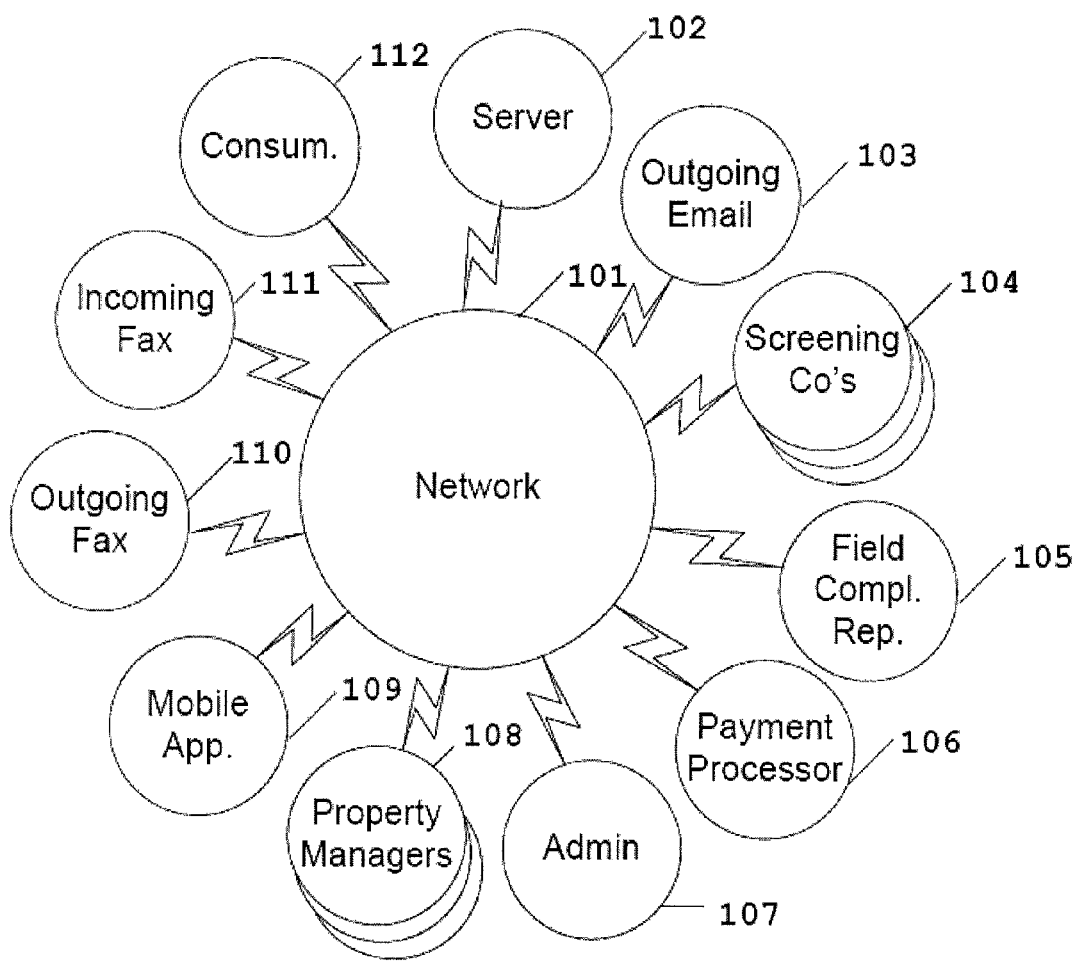
FIG. 1 is a block diagram illustrating an overview of an example architecture which could be used to implement certain aspects of the disclosed technology.

Turning now to the figures, FIG. 1 depicts an example architecture for a system which can be used to implement certain aspects of this disclosure. Such a system can be based on one or more servers [102], which can include one or more databases. For example, there could be implementations in which there is a main interaction server connected to the Internet that would support communications such as discussed below, and a second offline server which would host a database of sensitive information (e.g., background checks; personal data which, if accessed by unauthorized parties, could be used for identity theft, etc). Of course, other types of architectures (e.g., those in which there are multiple tiers of servers associated with multiple tiers of security, internal firewalls, etc) are possible, and could easily be implemented by those of ordinary skill in the art in light of this disclosure. It should be understood that the disclosure set forth herein is not limited to any one of such architectures, and that the use of terms such as "server," "database," and the like is made for convenience, and not to imply any requirements on the physical setup of a particular system. As shown in FIG. 1, regardless of the specific setup, the system can be used by entities such as site administrators [107], consumers [112], property managers [108], and field compliance representatives (FCRs) [105].

Communications between various components and users can be made through channels such as outgoing email [103], outgoing [110] and incoming fax [111], and mobile applications [109]. Additionally, in some cases these (or other) communication channels could be used to communicate with outside entities, such as screening companies [104], or payment processors [106]. Various communications which might take place, as well as contexts for those communications, are discussed below.

Figure 2:
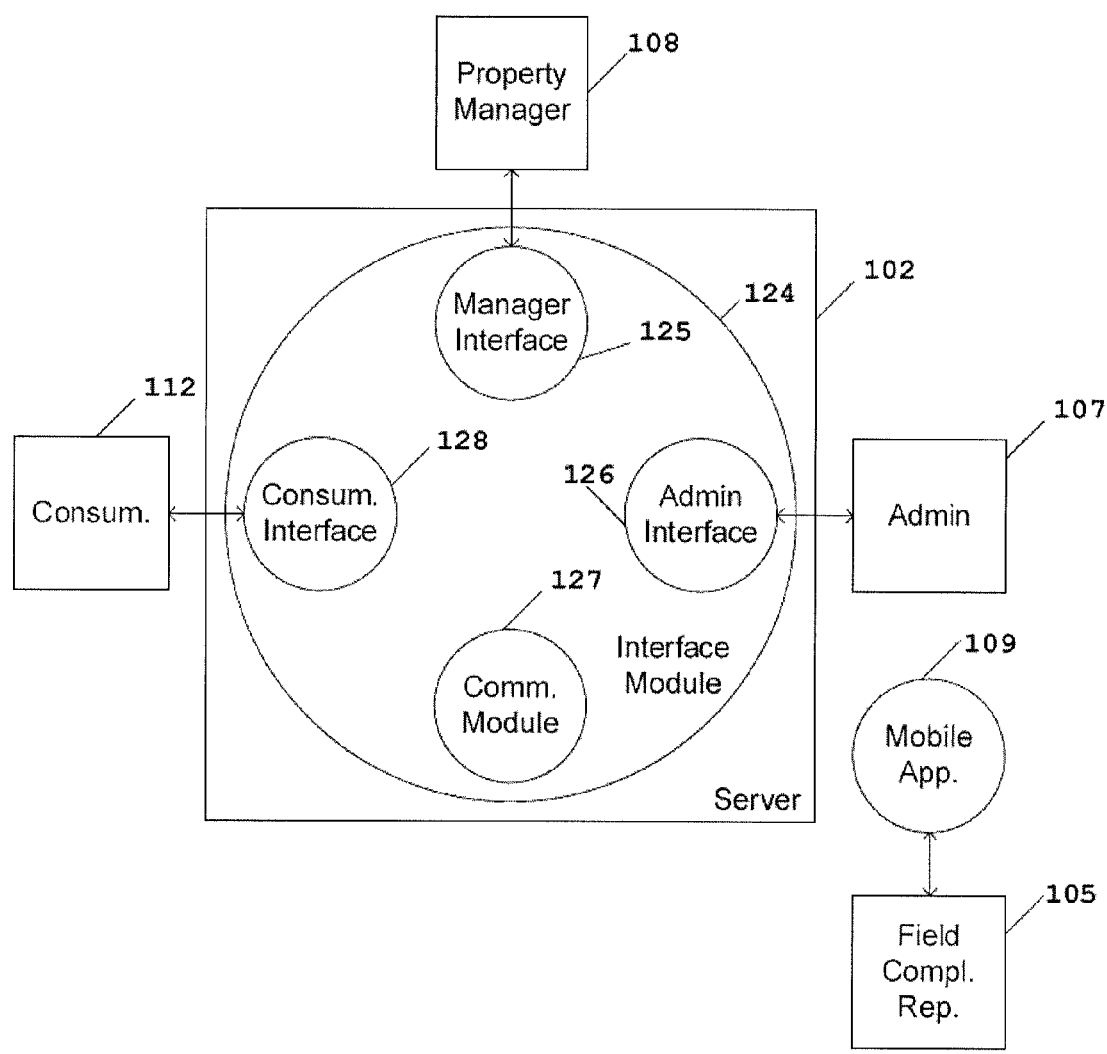
FIG. 2 is a block diagram illustrating an example interface architecture for a system which can be used to notify one or more property managers of a consumer's interest in the property managers' vacancies, and to facilitate or verify compliance by those property managers with applicable regulations.

FIG. 2 illustrates an example interface architecture for a system which can be used to notify one or more property managers [108] of a consumer's interest in the property managers' vacancies, and to facilitate or verify compliance by those property managers [108] with applicable regulations. In FIG. 2, four entities are shown which can use the system through the various interfaces: a consumer [112], a property manager [108], an admin [107] and a FCR [105]. In some implementations, each of those entities can be presented with a unique interface to access the functionality of the system. For example, in some implementations, a server [102] could be used to provide a website, which would include different pages that could act as interfaces to various users, such as a consumer interface [128], a manager interface [125], and an admin interface [126]. Additionally, as shown in FIG. 2, it is possible that each of those interfaces could be implemented as part of an interface module [124], and could potentially communicate with each other (or with other components) via a communication module [127]. It is also possible that some implementations might include interfaces which are not provided by the server [102]. For example, there could be a mobile application [109] on a mobile device carried by a field compliance representative [105] which could provide a custom interface which would allow the field compliance representative [105] to interact with the overall system (e.g., by communicating with the server [102]). Other architectures, such as where different users (e.g., the customer [112], property manager [108], and admin [107]) use custom application interfaces rather than website interfaces, or where a field compliance representative uses a website interface [105] are also possible. Accordingly, the architecture of FIG. 2, and the accompanying discussion of interfaces, should be understood as being illustrative only, and not limiting.

FIG. 3 (separated into FIGS. 3a-3h for readability) depicts a diagram showing potential actions which might take place in the process of identifying vacancies of interest to a consumer, notifying the relevant property managers of that interest, and allowing at least one of the relevant property managers to view information on the consumer and to potentially invite the consumer to become a tenant. The process begins in FIG. 3a, with actions that a consumer can take to create a list of vacancies which can be used to notify property managers of his or her interest in becoming a tenant (a "Notification List"). As shown in FIG. 3a, the process could begin with a consumer making a choice [200] of whether to start the Notification List using a consumer home page [201] (e.g., a web page provided as part of the consumer interface [128] by the server [102]) or using a shopping cart from an external interne listing service (ILS) [203]. To support this choice, the server [102] could be configured to, if the consumer chooses to start the Notification List using the cart at an ILS [203], automatically launch a cart application [260], and communicate with the ILS to receive the cart data [202] (e.g., via an external data feed through the communication module [127]). Alternatively, as shown in the exemplary ILS shopping cart of FIG. 14, the user could activate a notify button [1401] (which could be added to the shopping cart by prior arrangement between the ILS and an entity using the disclosed technology) to automatically add the vacancy associated with the notification button [1401] to a pending notification list. Other alternatives are also possible. Regardless of the specific approach used to allow a user to indicate a desire to import data from a shopping cart into a Notification List, once that desire had been indicated, the server could automatically communicate with the ILS to receive the data. The data could include a variety of information about vacancies, such as the fax number or email address associated with the vacancy, or the vacancy's address. Then, if the consumer decides to add more vacancies [205], an interface could be provided to allow the user to manually add more vacancies to the list started with the data received from the ILS [206].

Also, as shown in FIG. 3a, it is not necessary for the consumer to start a Notification List by importing a shopping cart from an ILS. For example, if the consumer had chosen to start at a home page [201] rather than with data from a cart at an ILS, the consumer could simply manually add any vacancies he or she was interested in [204]. The server could then retrieve contact information for the property managers associated with those vacancies [207], either from information provided with the vacancies themselves, from its own records, or from some other source. Additional information could also be added. For example, in cases where there is a database storing information regarding individual property managers (e.g., manager accounts), if the consumer enters information about a vacancy associated with a property manager in the database, the interface presented to the consumer could be updated to reflect the stored data (e.g., by adding a green "ok" symbol indicating that the property manager has an existing account, by adding a link to access more information about the property manager, such as other vacancies he or she might have available, by auto-completing data regarding that property manager, or by taking some other action). Such functionality could be supported in a variety of ways. For instance, there could be index structures organized by the property manager's attributes, which could be used to identify if information is available about a property manager without having to do a full database search (e.g., an index organized according to fax numbers, so that if a consumer enters a fax number associated with a property manager, that number could be quickly looked up in the index and the appropriate action taken). Of course, it should be understood that these different potential approaches which could be provided to a consumer do not necessarily mean that the consumer will be presented with different tools or interfaces. For example, the consumer's Notification List might be presented in an interface such as shown in FIG. 13, where a list of vacancies [1301] can be provided without necessarily showing whether those vacancies were retrieved from cart data, or entered manually.

Figure 3B:
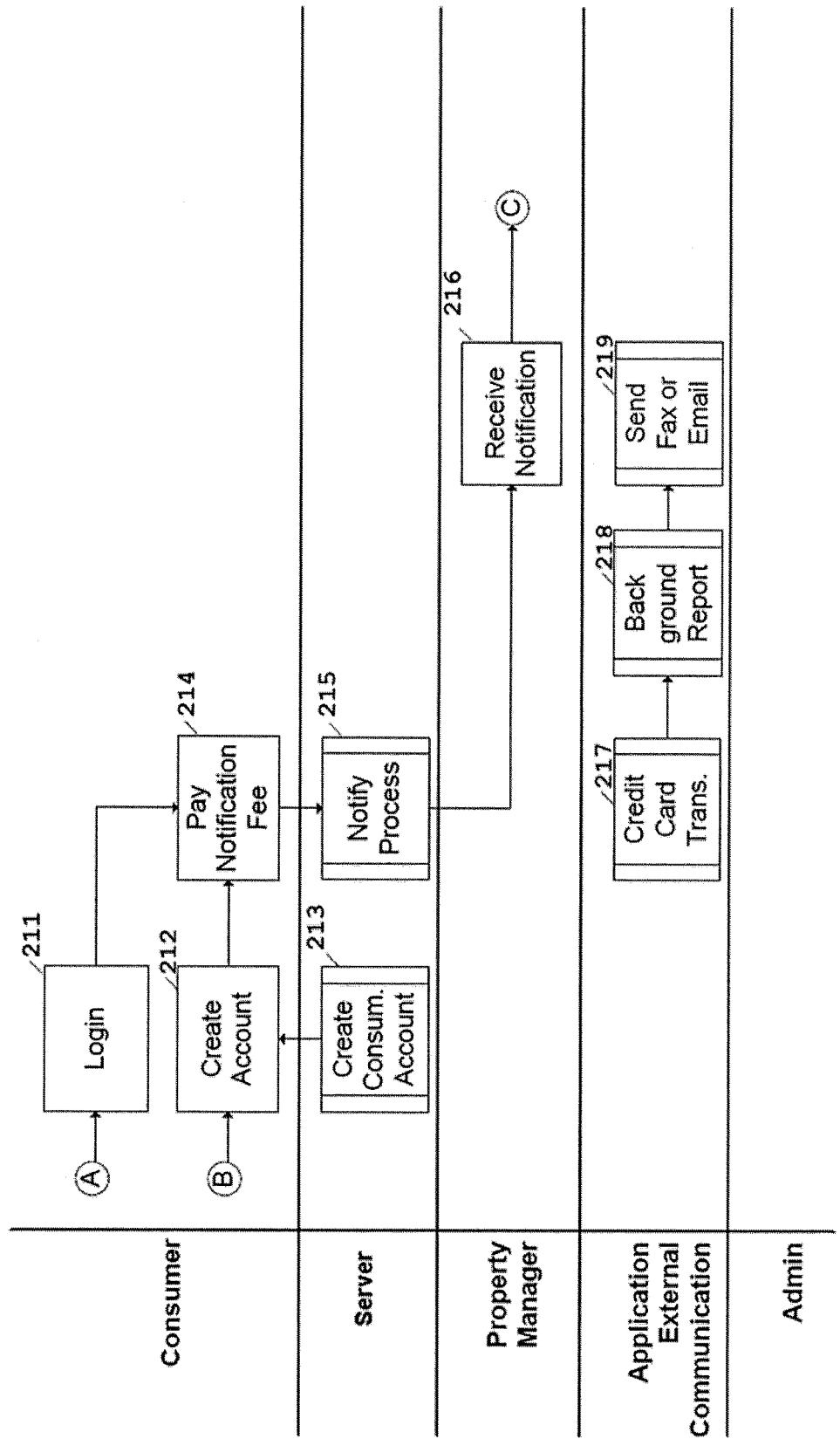

As shown in FIG. 3a, once one or more vacancies have been added to a Notification List, the consumer can choose [208] to send notifications to the property managers associated with the selected vacancies, or drop out of the process [209]. The server can be programmed to respond to this decision by, if the consumer chooses to notify, checking to see if the consumer has an existing account [210]. Continuing to FIG. 3b, if the consumer does have an account, he or she can be prompted to login [211] so that a notification fee for notifying the property managers associated with the properties on the Notification List of the consumer's interest in becoming a tenant can be paid [214]. If the consumer does not have an existing account, then he or she can be prompted to create an account [212], and the server can automatically launch an account creation process [213]. This account creation process could include setting (or being assigned) a login and password, and could also include entry of various information which would facilitate the rental process. For example, the account creation process could require the consumer to provide the same type of information which would be included in a rental application form (and could be requested using an interface modeled after such a form), such as credit card information, birth date, social security number, date and location of birth, current and prior addresses, current and prior employers, salary information, contact information for references (e.g., current landlord), desired features in the home (e.g., pets, handicapped access, first floor, smoking, number of bedrooms/bathrooms, desired lease term, and the most they will consider paying in rent). In such a case, this information entered at account creation could be used to automatically fill in applications which would be presented to property managers, thereby removing the need for re-entering this information multiple times. Similarly, this information could be used to generate a pre-qualification package (e.g., including a summary, as discussed later), which a consumer could print, and present to other property managers as necessary.

Figure 12:
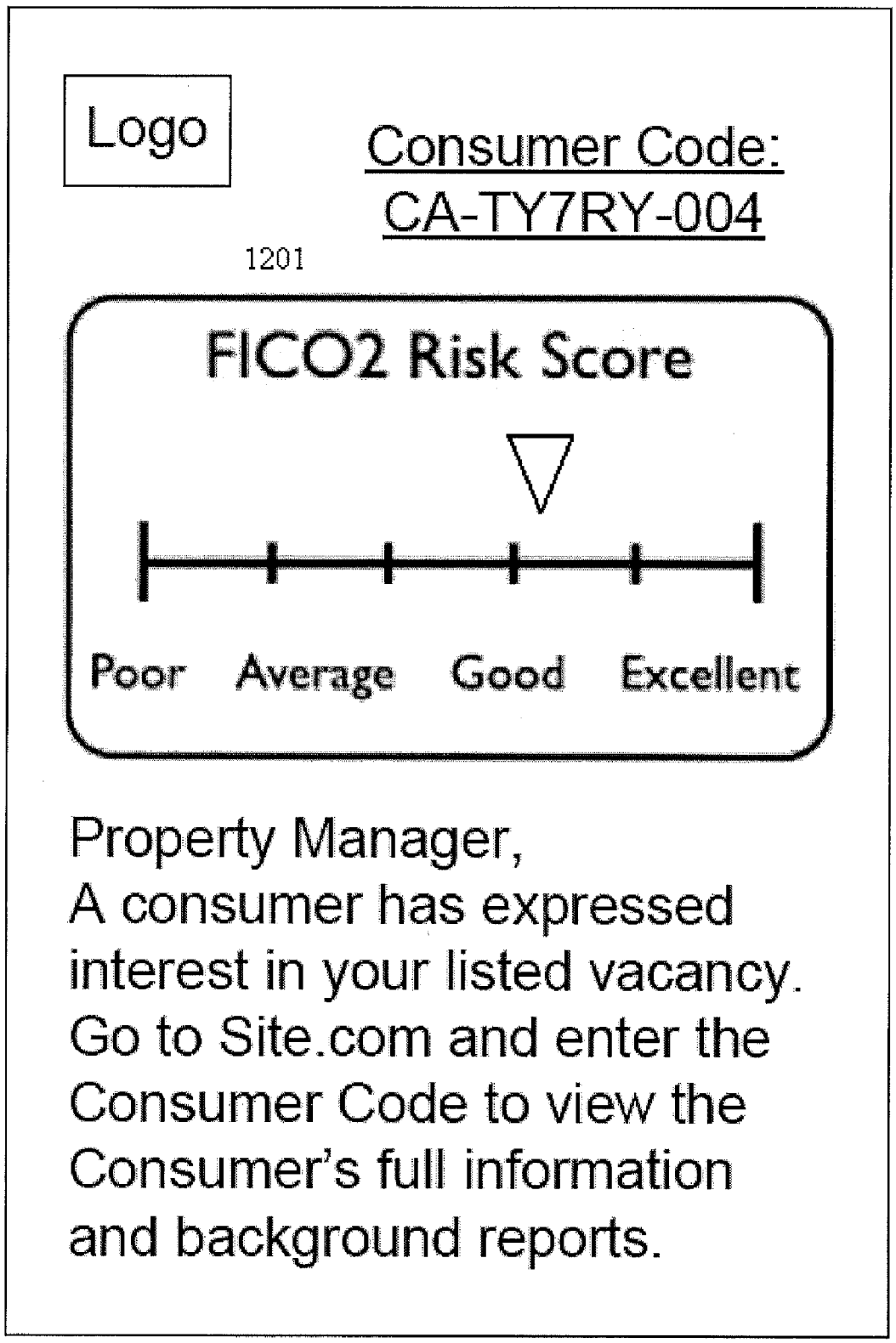
FIG. 12 depicts an exemplary notification which could be used to inform a property manager of a consumer's interest in a vacancy.

After login (and/or the creation of an account, if appropriate in a given instance), if the consumer has a pending Notification List, the consumer may then be asked to pay a fee [214] to start the notification process [215]. The notification process [215], which could be performed automatically by the server, could include a variety of steps, such as: 1) a credit card transaction [217] through a payment processor [106] using a communications module [127] to communicate with an external system; 2) purchase, retrieval, and storage of background reports [218] from one or more screening companies [104]; and 3) sending an external communication [219] (e.g., outbound fax or email notification) to the property managers associated with the vacancies on the Notification List. The appropriate property managers could then receive a notification [216] that provides summary information, such as shown in FIG. 12, in an anonymous form compliant with the FCRA, FACTA and Fair Housing Acts, of the consumer's vacancy preferences (e.g., bed/bathroom requirements, or other information which might have been entered during account creation), qualifications (e.g., credit risk score [1201]), and their interest in the property manager's vacancy. As set forth previously, such summary information could also be included in a pre-qualification package provided or made available to consumers.

Figure 3C:
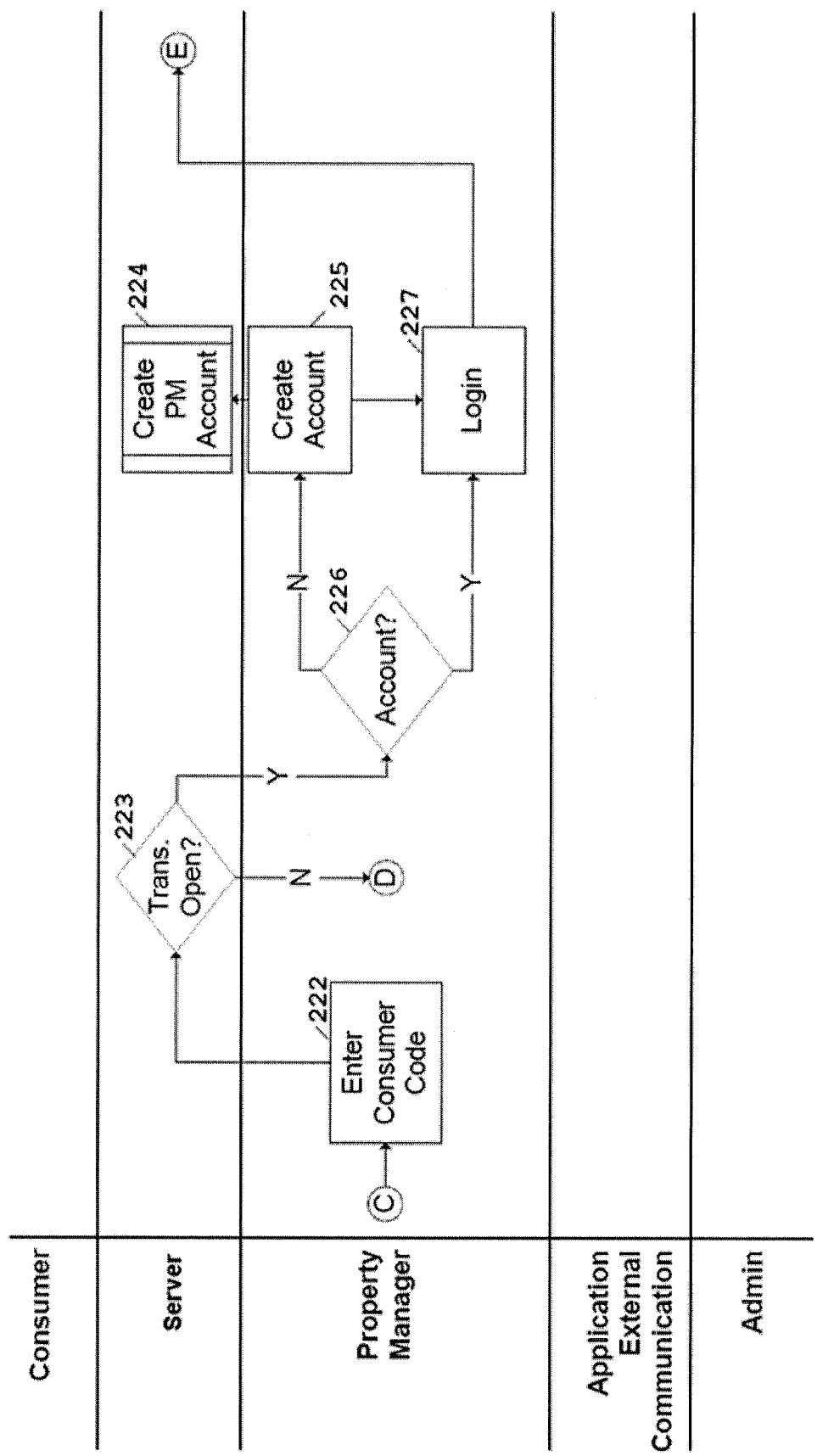

As shown in FIG. 12, in some implementations, the notification to the property manager could be used as an invitation to view the consumer's full information as a candidate for the vacancy. This could be supported in a number of manners, including by sending a link in an email for a manager, by including a consumer code (which could be automatically generated by the server, and could be unique to the vacancy, the consumer, and/or the Notification List) in the notification sent to the property manager, or by some other means. Turning now to FIG. 3c, that figure shows acts which could take place after the property manager receives a notification [216] which includes a unique consumer code. In implementations following the process depicted in FIG. 3c, the property manager could be instructed to enter the consumer code [222] at an interface provided by the server. An example of such an interface is provided in FIG. 7, which depicts a web page that could be presented which includes a consumer identification field [701] where the consumer code could be entered [222]. Note that the web page of FIG. 7 also includes a login tool [702] which could be used independently of the consumer identification field [701]. This could be used in some implementations to allow consumers to use the multiple notification features described herein to notify property managers regardless of whether they have previously created accounts. As described in greater detail herein, in a case where a notification is sent to a property manager without an account, it is possible that that manager will be allowed to create the account dynamically, once he or she indicates an interest in viewing information for the consumer. Of course, other approaches, such as where notifications could only be sent to property managers having existing accounts, could also be implemented. Accordingly, the interface shown in FIG. 7, along with the discussion of notifications and account creation, should be understood as being illustrative only, and not limiting.

As shown in FIG. 3c, once a property manager enters a code (or indicates a desire to review consumer information in some other way) one or more checks could be preformed to determine whether the property manager's request to view the information should be granted. A first of those checks might be to check if the transaction represented by the initial notification to the property manager is still open [223]. This could be useful in cases where information about the consumer includes information for which there are restrictions on dissemination, such as a background report, which might be limited to only being disseminated to a single property manager per purchased report. In such a case, if the transaction was not still open (e.g., because another property manager on the consumer's Notification List has already viewed the consumer's information), the property manager may be given the option [254] to invite the consumer to send a new notification [255] such as via an email [256] from the external communication module as shown in FIG. 3g. If the property manager invites the consumer to make a new notification, the consumer may have the option to either add the interested property manager's vacancy information to another active Notification List [257], or create a new Notification List [258]. If the consumer chooses to create a new Notification List [258], he or she may pay a new notification fee [214] and proceed with a notification process [215] the same as, or similar to, that discussed above with respect to FIG. 3b.

Figure 3D:
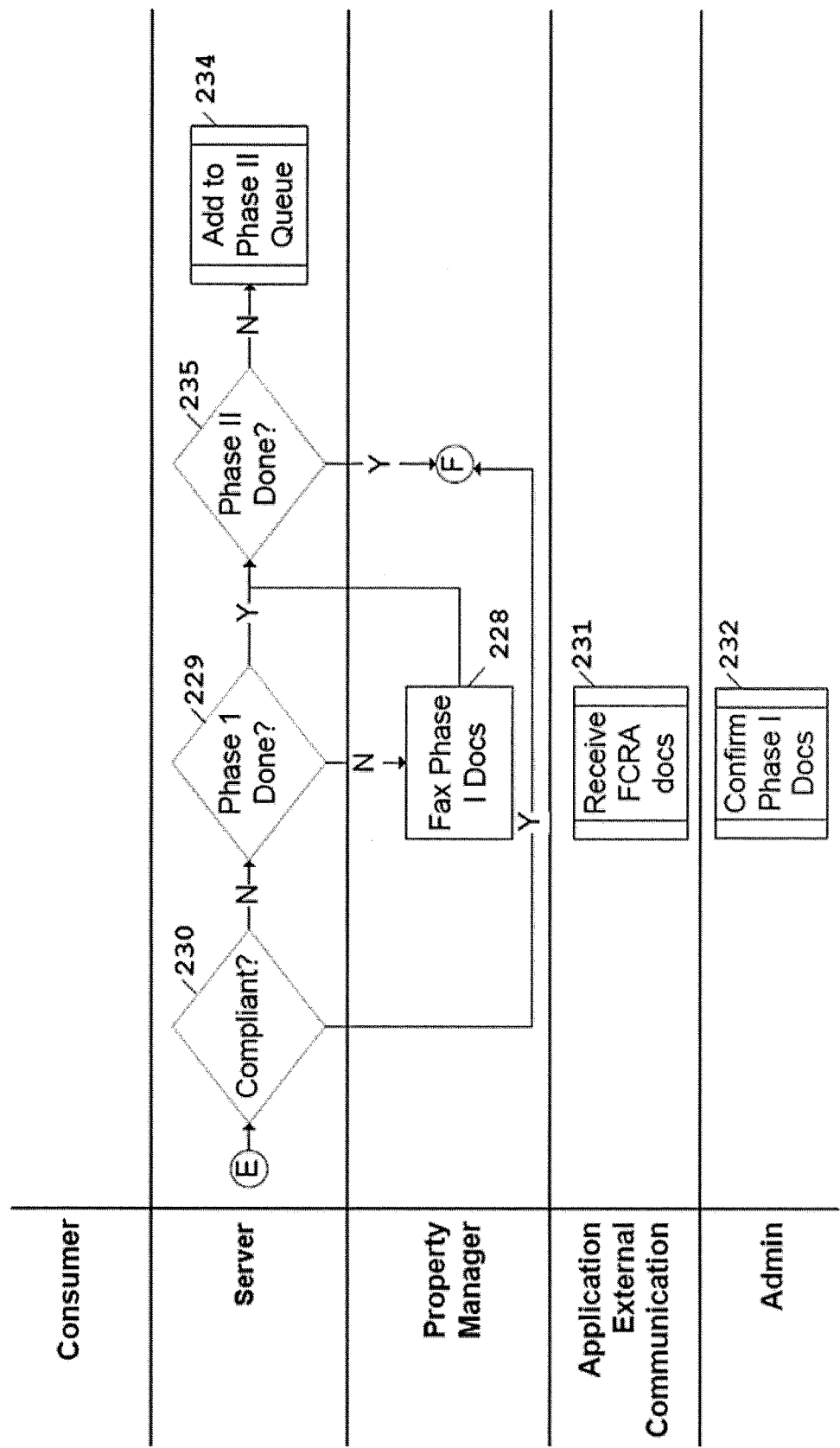
Figure 3E:
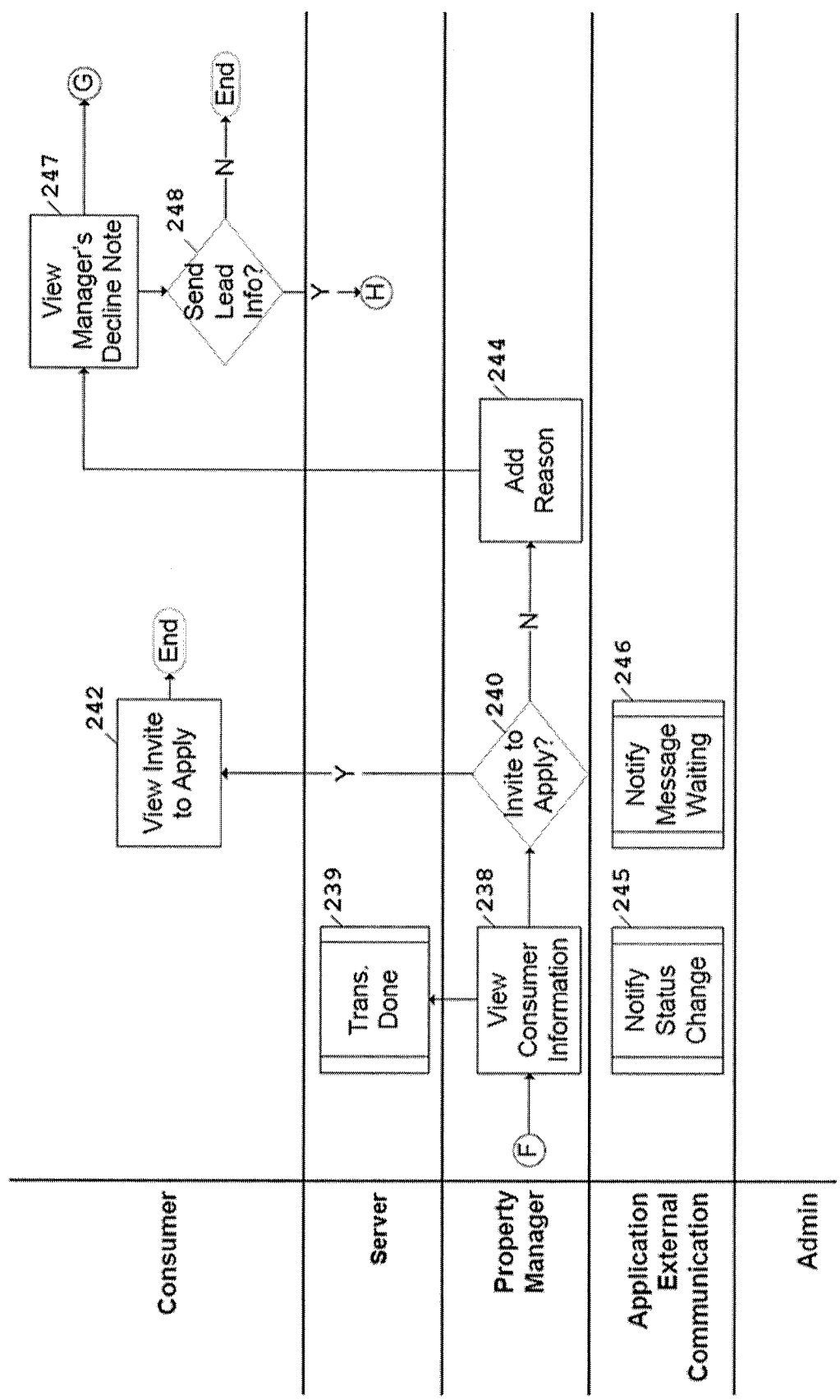

Alternatively, if the transaction is open (or if the consumer creates a new notification in response to a request from the property manager), a check may take place to verify that the property manager has an account [226]. If the property manager does have an account, he or she can be requested to log in [227]. If the property manager does not have an account, he or she can be presented with the option of creating an account [225], such as by entering information as requested by account creation module [224] on the server. After the property manager has logged in [227] (either to a newly created account or to a pre-existing account), as shown in FIG. 3d, a check [230] can be performed to verify that the property manager is compliant with the appropriate regulations, such as the fair credit reporting act (FCRA). As shown in FIG. 3e, if the property manager has completed the necessary compliance steps, he or she could be allowed to view the consumer's information [238]. Once the consumer's information is viewed [238], the server could automatically update the status of the transaction [239] to indicate that the background report purchased for the initial notification request had been viewed. An email or other notification could also be sent to the consumer [245], notifying him or her of the change in transaction status. The property manager could then be presented with an option [240] to invite the consumer to formally apply for the vacancy [242] (or to become a tenant, in implementations in which lease execution can be performed using the system), or reject the consumer as a possible applicant along with a reason [244].

Figure 3F:
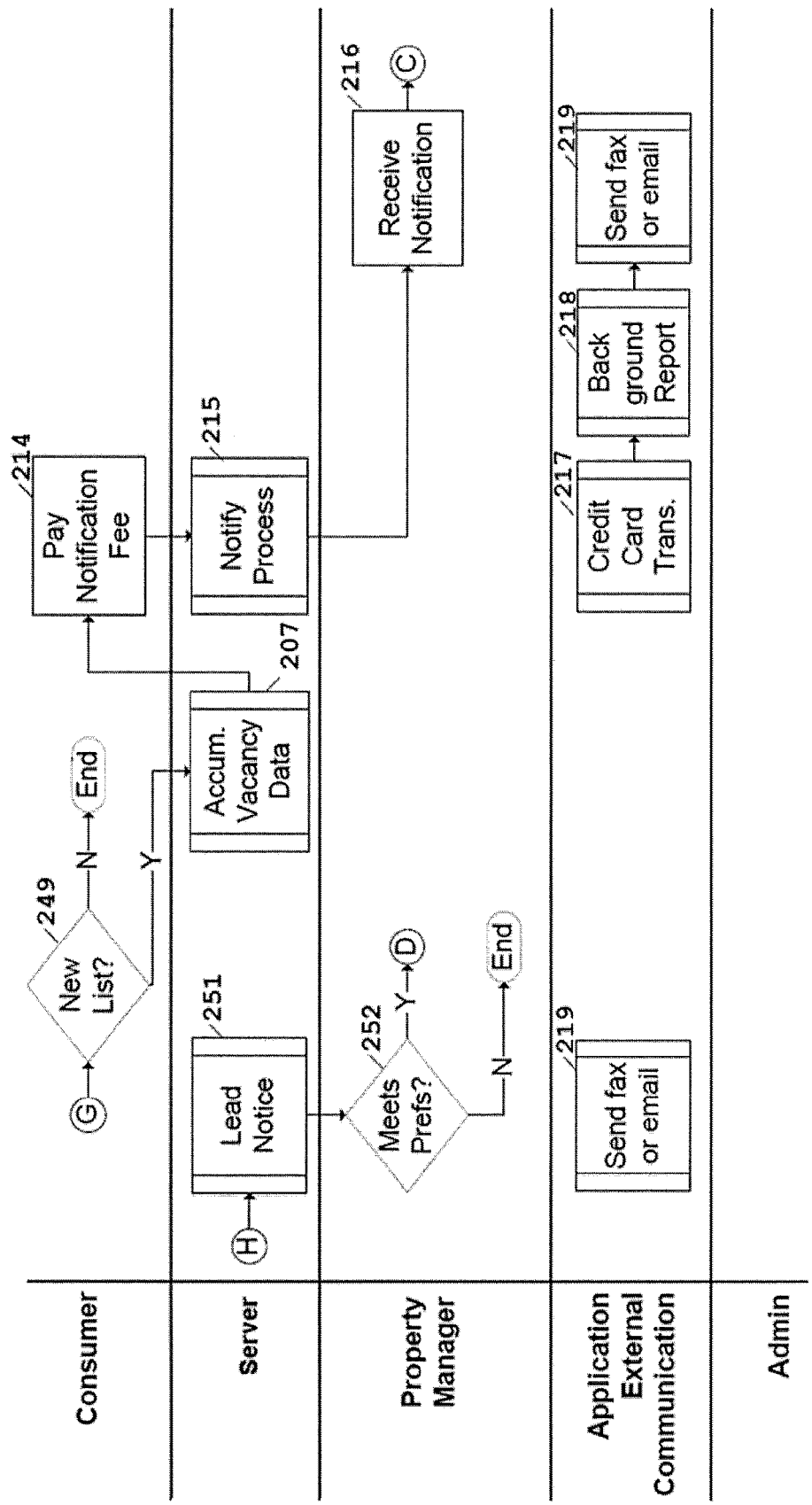

Once the property manager had made a decision as to whether to invite the consumer to apply [242] or to reject the consumer [244], the consumer could automatically be sent a notification [246] of the decision. The consumer could then use his or her account to view the property manager's invitation [242] or rejection (potentially along with reason [247]). If the property manager had invited the consumer to become a tenant (or to apply to become a tenant), then the consumer could engage in further interactions with the property manager to form a rental contract. Alternatively, if the consumer had been rejected as a potential tenant, he or she may be given the option of continuing the process by creating a new Notification List [249] as shown in FIG. 3f, or by notifying relevant property managers of his or her continued interest in the remaining vacancies on the previously created Notification List [248]. If the consumer decides to send a notification of his or her continued interest in properties on the previously created Notification List, the property managers associated with properties on that list could evaluate whether the consumer meets their preferences for tenants [252] and, if those preferences are met, view the consumer's background information as discussed above with respect to FIG. 3g.

Of course additional steps could also be performed. For example, in some implementations, there could be support for allowing consumers to modify Notification Lists even after a notification fee had been paid [214] and the notification process had begun [215]. Activities which could be performed in such a case are shown in FIG. 3h. As shown in that figure, a consumer may choose to add additional vacancies [220] to an active Notification List [221] at any time before a property manager from the active notification list seeks to view the consumer's information. As the consumer adds vacancies, the system may capture the required vacancy information [207] and send external communications [219] such as outbound fax [110] or email notifications [103] to the newly relevant property manager(s) [108]. These newly-invited property managers could also receive a notification that provides summary information, such as described above in the context of the notifications based on the original Notification List. Of course, other variations, including variations in which consumers would be allowed to add vacancies to a Notification List at any point until their information is actually viewed, variations where consumers might pay a fee to purchase background information prior to creating a Notification List, or variations where consumers would not be permitted to add vacancies to a notification list after paying the fee associated with that list are also possible. Accordingly, the discussion of FIG. 3h, like the discussion which preceded it, should be understood as being illustrative only, and not limiting.

While the above disclosure addresses the situation where a server is able to verify [230] that a property manager is in compliance with the relevant regulations (e.g., such as by checking FCRA information in a database), in some implementations, there might be support for addressing a situation where a server is not able to verify that compliance. For example, in a case where there is no record that the property manager has completed one or more FCRA steps, a server may direct the property manager to the earliest uncompleted FCRA phase: Phase I [229], or Phase II [235]. Phase I may require the property manager to fax documents to the company operating the server (or that company's designated representative, such as an admin) that would prove the property manager's management responsibility for the property [228]. A company admin [107] could review the documents [231] to confirm Phase I compliance [232] within an inbox provided as part of their admin interface [126]. Phase II compliance, which requires a physical inspection of the property manager's workspace, a short meeting with the manager, photos and a video recording is discussed below. In the event that a server detects that a property manager has not had a Phase II inspection [235], the property manager could be put into a queue [234] for an inspection by a Field Compliance Representative (FCR) [105]. Subsequently, the inspection could be performed by FCRs, perhaps facilitated with a mobile application which could support processes such as shown in FIGS. 5a-5e.

Figure 5A:
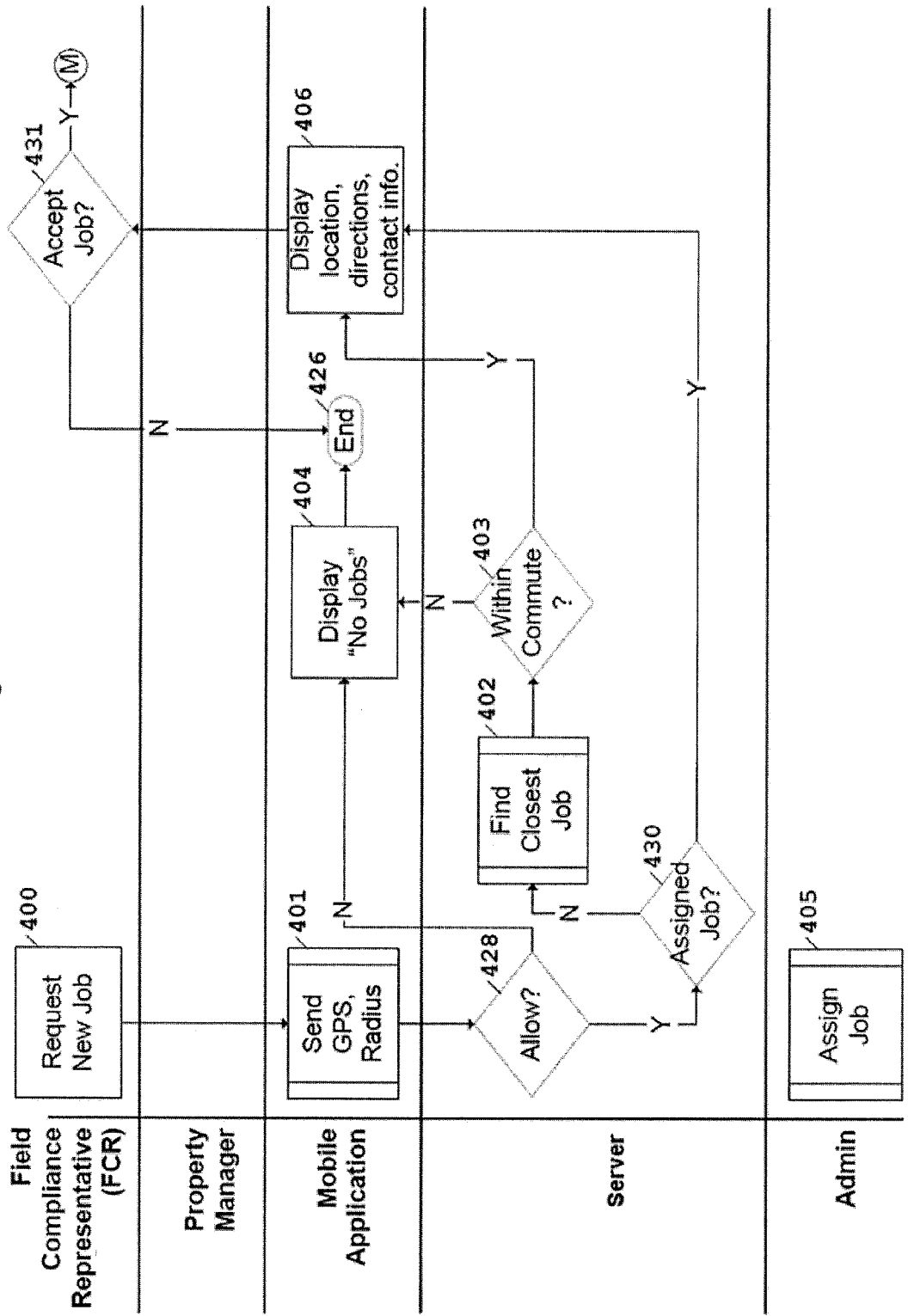
FIGS. 5a-5e depict activities which could take place in the allocation and completion of fair credit reporting act (FCRA) inspections.
Figure 5B:
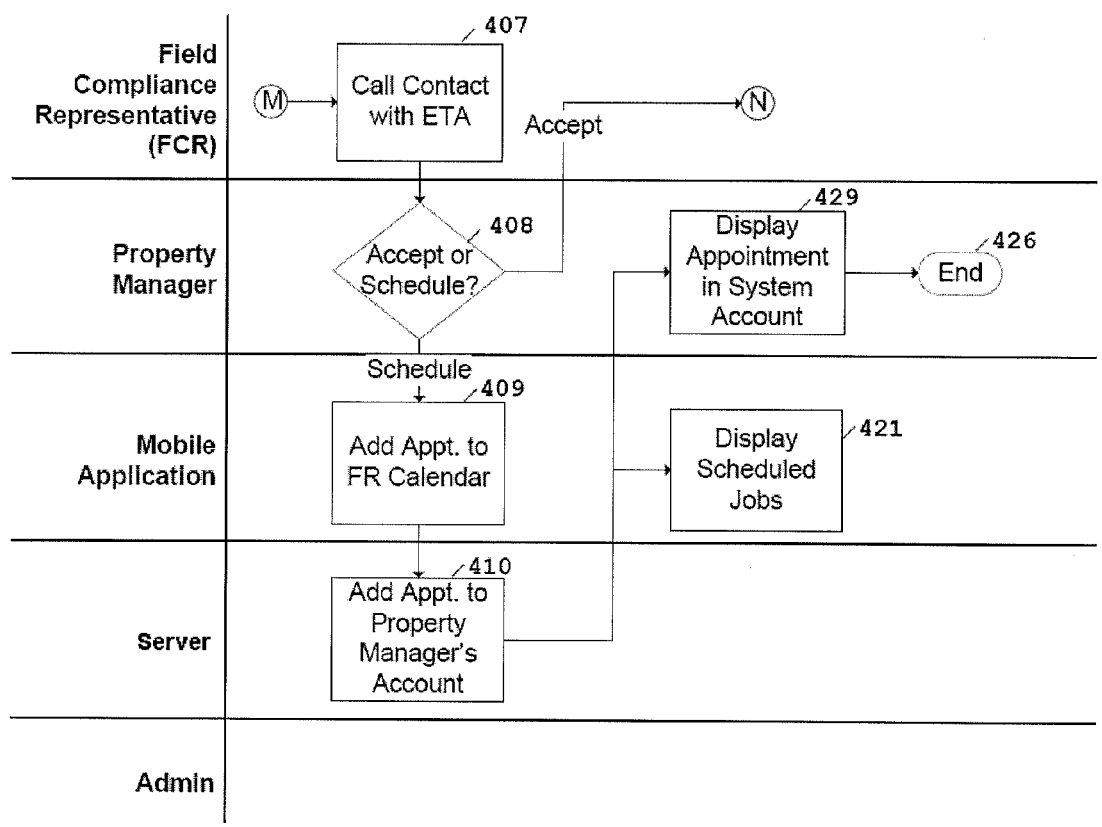

Turning now to FIGS. 5a-5e, the first of those FIGS. 5a and 5b, illustrate processes which could facilitate both the allocation of inspections to FCRs, and the scheduling of those inspections once allocated. Starting first with FIG. 5a, as shown in that figure, the process of allocating an inspection to an FCR could be started by an FCR using a mobile application [109] to request a new job (FCRA Phase II Inspection) [400] from an appropriate interface in the mobile application, such as a get job screen. An example of an interface which could be provided to allow a FCR access to such a get job screen is shown in FIG. 11, which includes a get jobs button [1101] that could be activated by the FCR. Once the FCR requests a new job, the mobile application could be programmed to send the request for a new job, the FCR's GPS location, and other information as appropriate (e.g., radius preferences for the FCR), to the server [401]. The server may then confirm that the FCR may be assigned a new job [428] (e.g., by checking to make sure that the FCR doesn't already have a job scheduled within a short timeframe of the request for a new job, by checking whether the FCR's ability to accept jobs has been suspended, by checking whether the mobile application used by the FCR is updated and functioning properly, by checking whether there are any jobs which could be assigned in the FCR's radius, and/or by performing other types of checks which may be appropriate in a given scenario). If a job cannot be assigned, the server could be configured to send an appropriate message to the mobile application, which could tell the FCR that no jobs exist [404]. If a job can be assigned, the server could be configured to check [430] if there is a job specially assigned to the FCR. If there is an assigned job (e.g., because an administrator manually indicated [405] that a particular Phase II compliance review should be completed by a particular FCR), then information about that job, such as its location, and the contact information for the property manager, can be provided to the FCR [406]. If there is not an assigned job, the server could examine the pending Phase II inspections, and determine which was most appropriate for the FCR, such as by checking which inspection was closest to the FCR's current location [402], and by evaluating the inspections against the FCR's preferences (e.g., indicated willingness to travel to jobs [403]). If there is an appropriate job, the mobile application may provide the job location, distance, directions and contact information [406] within a suitable interface, such as a new job screen. If there is not, the application could tell the FCR that no jobs exist [404], which completes the process [426].

Figure 5C:
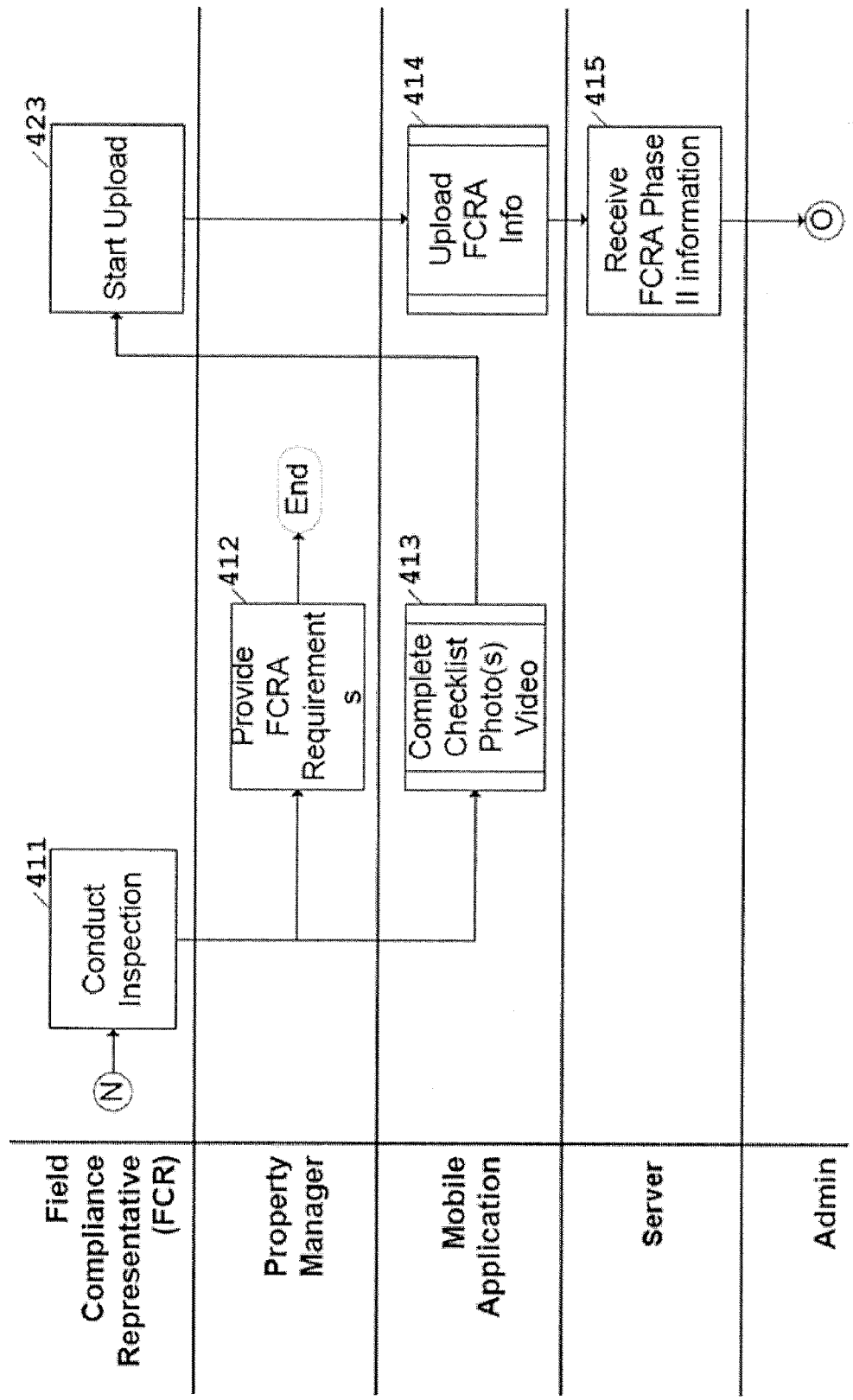

Once a FCR has accepted a job [431], the process can continue as shown in FIG. 5b, with the FCR contacting the property manager [407] to schedule the inspection. If the property manager can meet immediately [408], the FCR may offer an estimated time of arrival (ETA) and proceed to the property manager's location and, as shown in FIG. 5c, conduct the inspection [411]. Alternatively, if the property manager chooses to schedule an appointment for a future time [408], the FCR can add that appointment to a schedule in the mobile application [409]. In some implementations, the mobile application could then send a message indicating the appointment to the server, which could store that information [410] so that the property manager could view the appointment through his or her account [429]. This scheduled event may also be viewable through the admin's account, such as in an FCRA Phase II screen. It could also be displayed within the FCR's mobile application [421] in an appropriate interface such as a scheduled jobs screen.

Figure 5D:
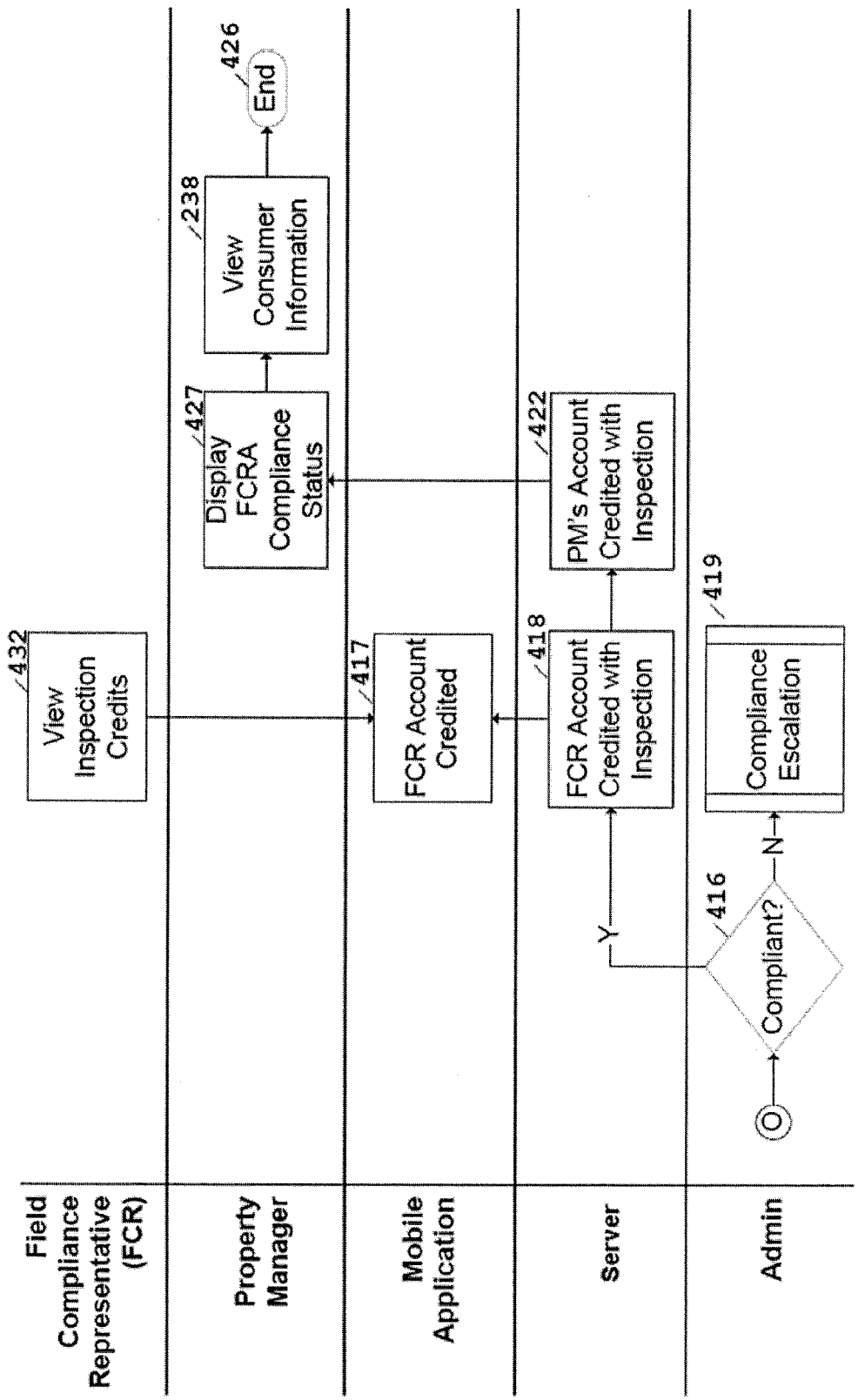
Figure 5E:
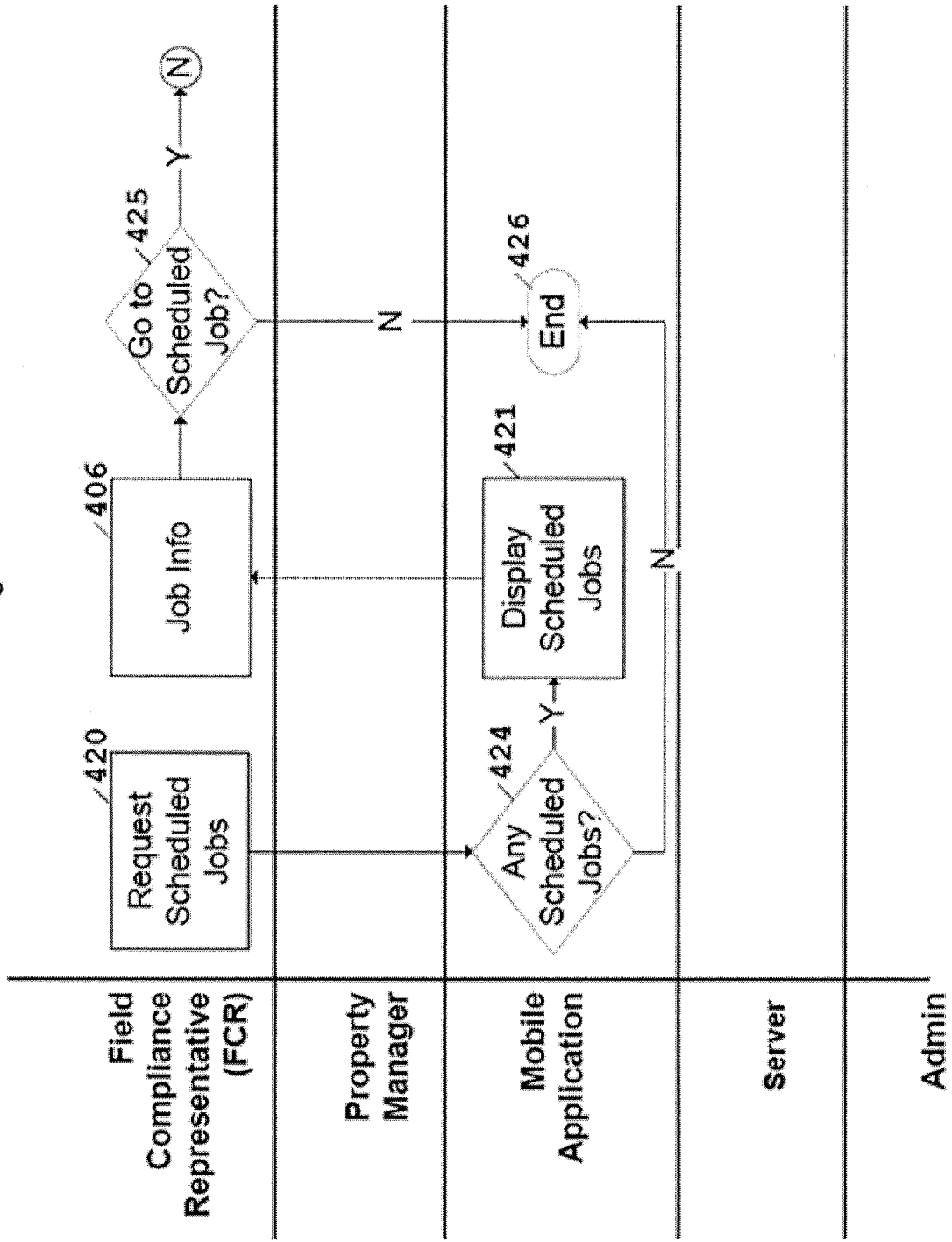
Figure 10:
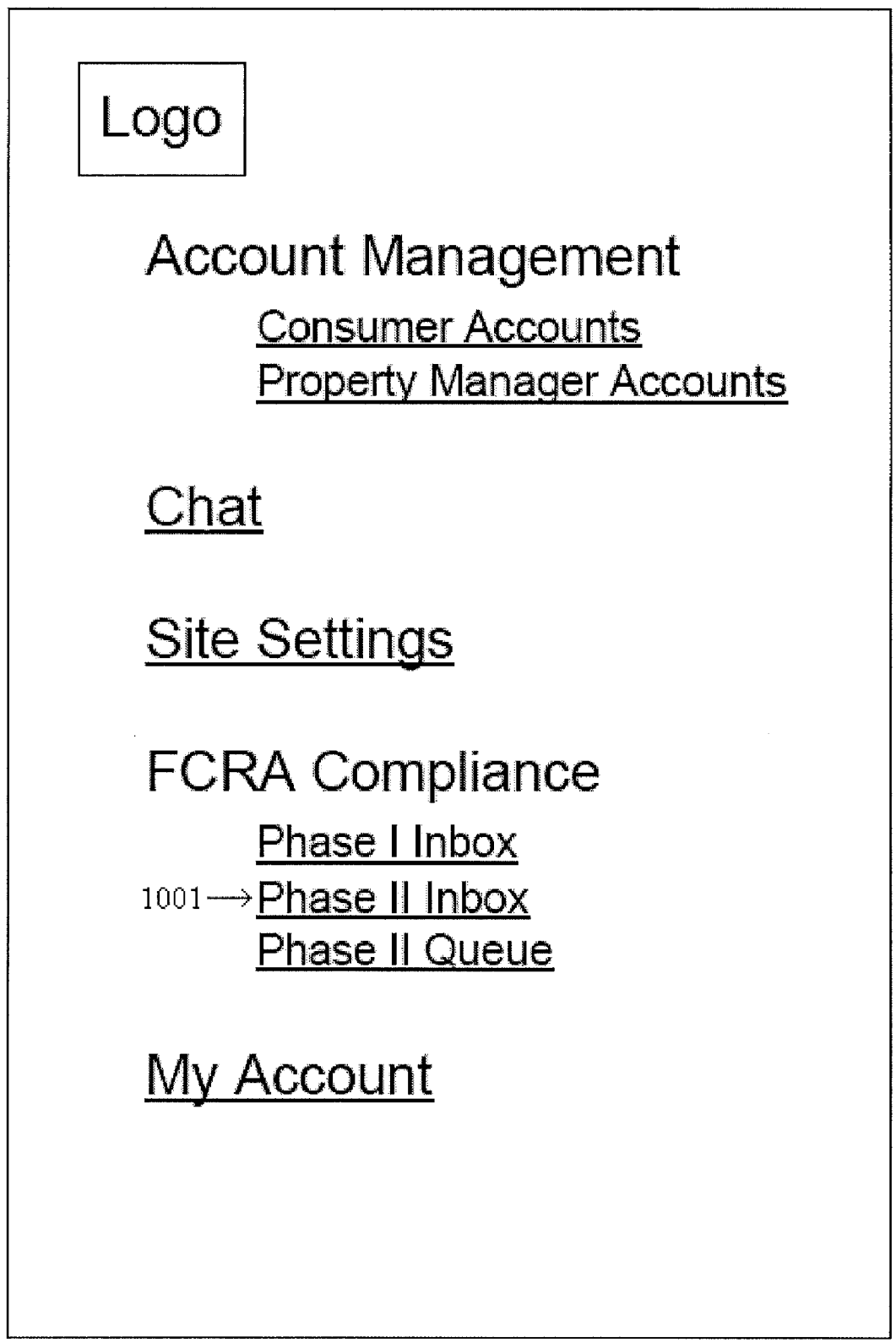
FIG. 10 depicts an interface which could be presented to an administrator.

In addition to facilitating allocation of Phase II inspections, in some implementations, a mobile application could include features to facilitate the Phase II inspection itself. For example, at the inspection, the mobile application may provide the FCR with a checklist of items to verify (e.g., that the location is a property management office, rather than a private investigator, a dating service, or an unscrupulous individual who intends to commit identity theft), items to photograph (e.g., make a photograph of the office or workspace itself), and a video recording requirement [413] (e.g., instructions to have the FCR ask the property manager to make a statement such as "I am John Smith of XYZ property management company. I will comply with the Fair Credit Reporting Act, Fair Housing Act, the Fair and Accurate Credit Transaction Act, and all local and state laws in my use of the system" and potentially to supplement (or replace) such statement with a similar written affirmation and signature). The mobile application might also interact with the equipment resident on the mobile device to assist in gathering that information (e.g., if the mobile device includes a digital camera, the mobile application could include a utility that could interface with the digital camera to take the appropriate pictures). Once the appropriate information had been gathered (whether from being provided by the property manager [412], collected using the mobile device, or by some other means) the FCR can indicate that the information should be uploaded [423], which could cause the mobile application to initiate a function which would send the information to the server [414], and cause the server to initiate a function to receive and store that information [415]. As shown in FIG. 5d, once the information had been uploaded, an admin [107] may review the inspection information for completeness [416] from within an appropriate interface, such as a FCRA Phase II inbox screen. An example of an interface which could be presented to allow an admin to access a FCRA Phase II inbox screen (i.e., through a FCRA Phase II inbox link [1001]) is shown in FIG. 10.

When the admin has reviewed the inspection information, he or she can be presented with an option [416] to either approve the inspection materials, or deem them incomplete. If the admin decides to deem the materials incomplete, they can be referred to a compliance escalation [419], which could involve sending a message to the FCR stating what additional information is necessary to complete the inspection, assigning a new FCR to redo the inspection, restricting the original FCR from being assigned future jobs (perhaps pending training on proper inspection procedures), and/or other activities as might be appropriate in a particular situation. Alternatively, if the materials are deemed to be complete, then a reimbursement account associated with the FCR can be credited by the server [418] and such credit could also be represented in an account on the FCR's mobile application [417]. The FCR could then use the mobile application to view his or her inspection credits [432] from a suitable interface, such as a dedicated job credits screen. Also, in some implementations, if the inspection material is deemed complete, there could be an automatic update performed on FCRA status information for an account associated with the property manager [422]. The property manager could then potentially review this status [427] via an appropriate interface, such as a dedicated FCRA screen. Once the compliance process is complete, the property manager could be allowed to view the consumer's information [238], after which point the process of deciding whether to invite the consumer to become a tenant could continue as described above with reference to FIGS. 3a-3h.

Of course, it should be understood that the activities discussed above are not intended to be treated as an exclusive catalog of all activities which could take place using a mobile application or to facilitate FCRA compliance inspections. For example, in some implementations, a mobile application might be configured to allow an FCR to make a request to present a list of any jobs that had been allocated to him or her [420]. If it is determined that any such jobs exist [424], the application may display the jobs and their schedules [421], otherwise it may show that no scheduled jobs exist [426]. The FCR may select a scheduled job which will show him the job details [406]. The FCR may then choose to go to the job [425], perhaps by seeing if the property manager for that job is available immediately, rather than waiting until the scheduled time. Other variations are also possible, and will be immediately apparent to one of ordinary skill in the art in light of this disclosure. Accordingly, the above discussion of job scheduling, as well as other functions which could be included to facilitate FCRA compliance, should be understood as being illustrative only, and not limiting.

Figure 4:
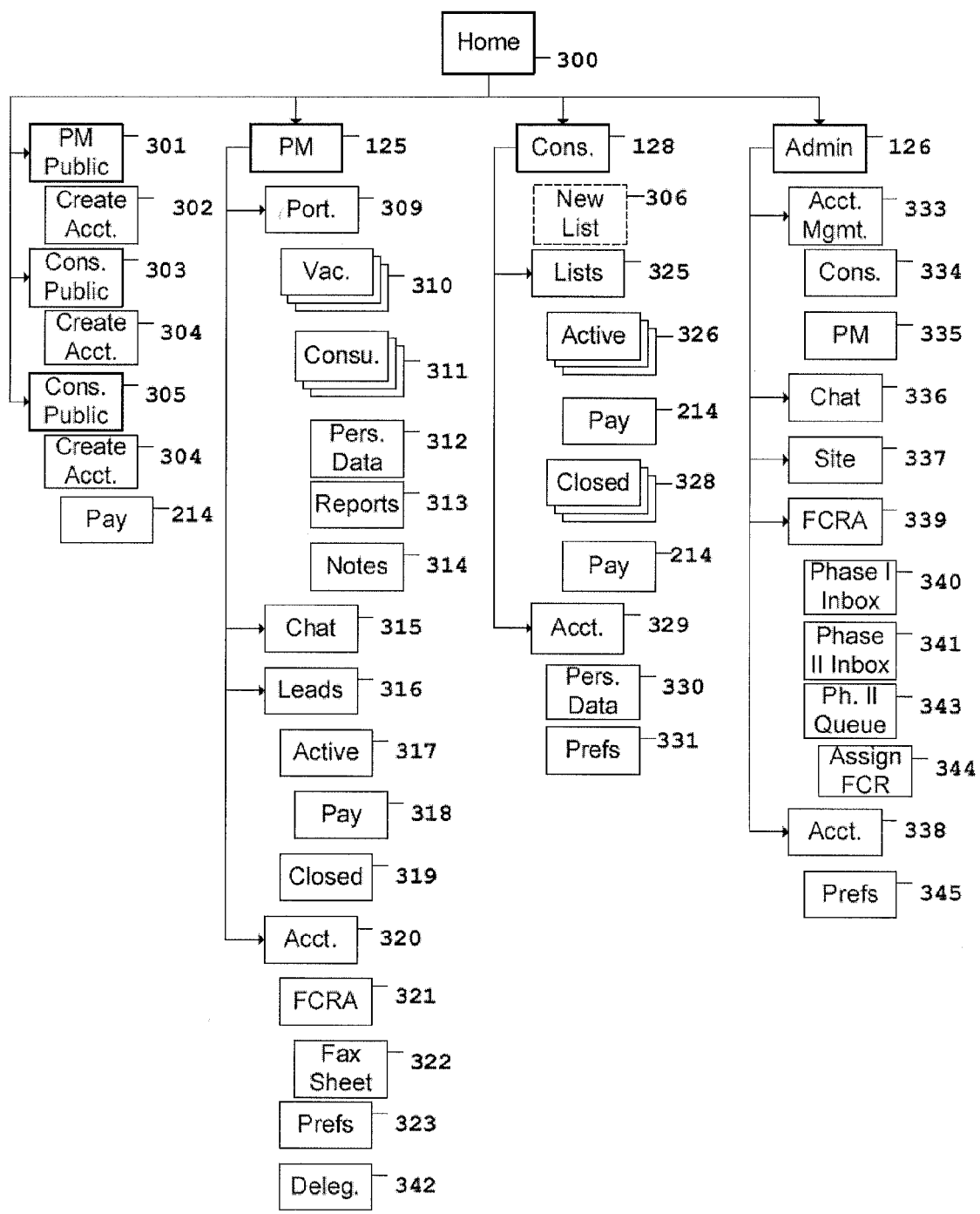
FIG. 4 depicts a site map for a website that can be used to provide an interface in support of certain activities described herein.

As will be apparent to one of ordinary skill in the art in light of this disclosure, different implementations could use a variety of techniques for structuring and facilitating the activities of the various users. As an example of one approach, consider FIG. 4, which depicts a map which could be used to organize interfaces presented by a website that could be used by administrators, consumers, and property managers. As shown in FIG. 4, a website may be used to provide a common portal for multiple participants, such as the consumer [112], the property manager [108] and the admin [107]. Such a website could include a home page [300], which could provide access to login fields (name and password) and a consumer code entry field [701] for property managers. Below the home page

[300] a website could be split into a number of sections, some of which could be made available without requiring the user accessing those sections to log in. Such public sections could include: a property manager public page [301], which could be used to access a property manager account creation page [302]; a general consumer public page [303], which could be used for marketing and/or to provide access to a consumer create account page [304]; and a notification consumer public page [305], which could be used to allow unregistered users to start Notification Lists, access a consumer create account page [304], and/or submit payments for their Notification Lists.

There could also be private (e.g., login restricted) sections. For example, there could be a property manager login-accessible section [125]. This section could include a property manager specific home page, an example of which is provided in FIG. 9, which could allow the property manager to access various subsections of his or her account. For example, there could be access provided to a portfolio section [309] which could allow the property manager to organize lists of vacancies [310] at a top level, then use a second page (or tool incorporated into the first page) [311] to assign consumers to those vacancies. The portfolio section [309] could also include interfaces which would allow the property manager to review data (assuming this review was consistent with the applicable requirements discussed previously) on consumers who had expressed interest in one or more of the property manager's vacancies. These interfaces could include a consumer's personal data section [312], a background reports section [313], and a notes section [314].

Figure 9:
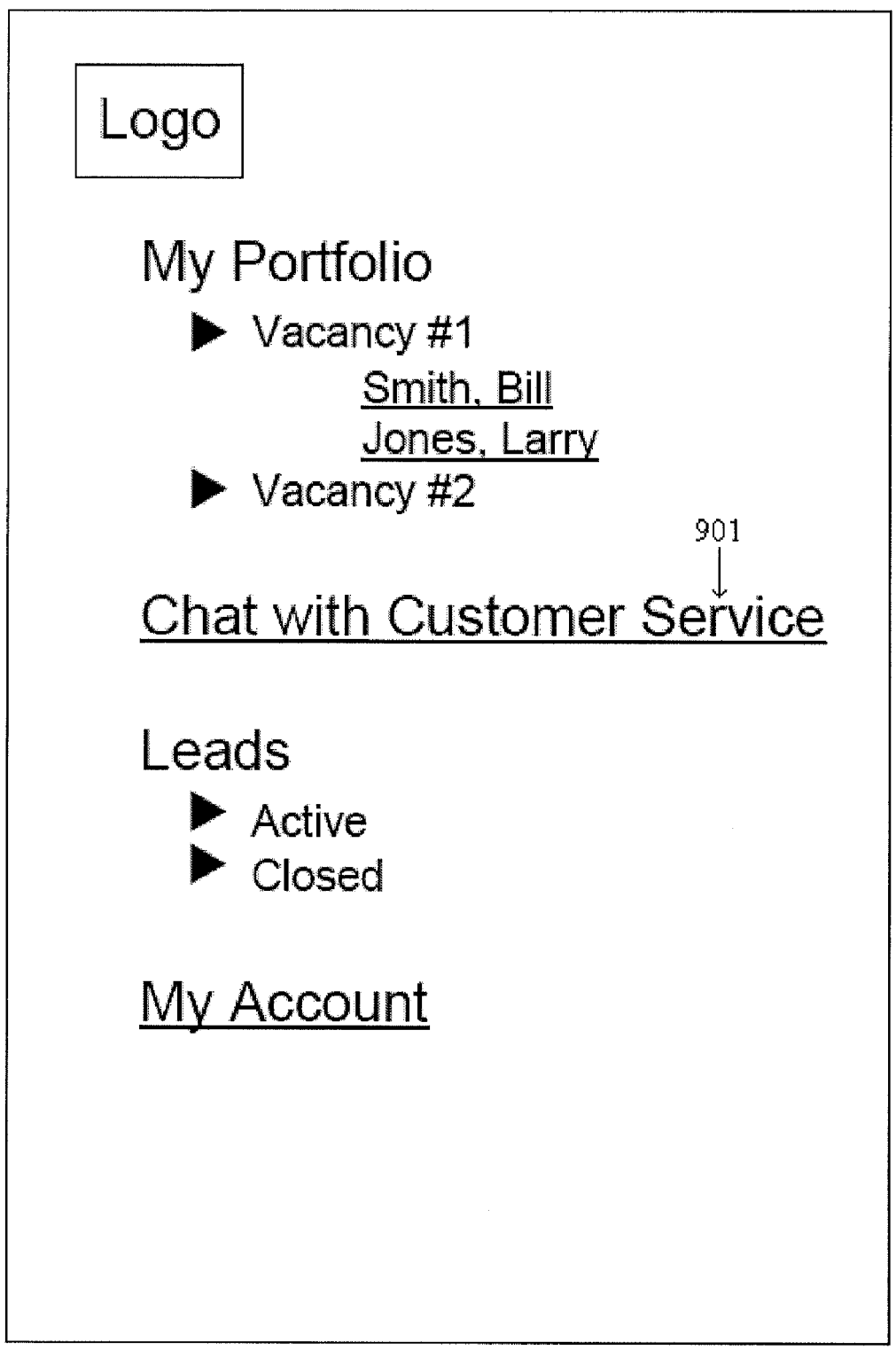
FIG. 9 depicts an exemplary interface which could be presented to property managers.

Other sub-sections could also be included in a property manager's private section. For example, as shown in FIG. 9, there could be a customer service section [315] (or a link [901] to such a section), which could provide a chat (or other suitable interface) where the property manager may communicate with a system admin regarding service issues. As another example, there could be a leads section [316], which could be configured to allow a property manager to view active (e.g., instances where a consumer who had indicated an interest in one of the property manager's properties had recently been declined by a different property manager) leads [317] and closed (e.g., instances where a consumer who had indicated an interest in one of the manager's properties, but the manager had either declined to invite that consumer to become/apply to become a tenant or had declined to request that consumer send a notification which would allow the manager to view the consumer's background information) leads [319]. To optimize usefulness of the active leads information, there might also be a payment section where the property manager could pay for access to leads [318] (e.g., allowing the property manager to pay a monthly fee to view a list of consumers who were rejected by other property managers and have preferences and/or locations which are compatible with/in the area of vacancies managed by the property manager). There could also be an account page [320], which could be configured to allow the property manager to view his or her FCRA status [321], access a FCRA Phase I Fax Cover sheet [322], preference information [323] and delegates [342] (e.g., where a property manager has multiple offices, viewing the FCRA status of each of the offices).

Figure 8:
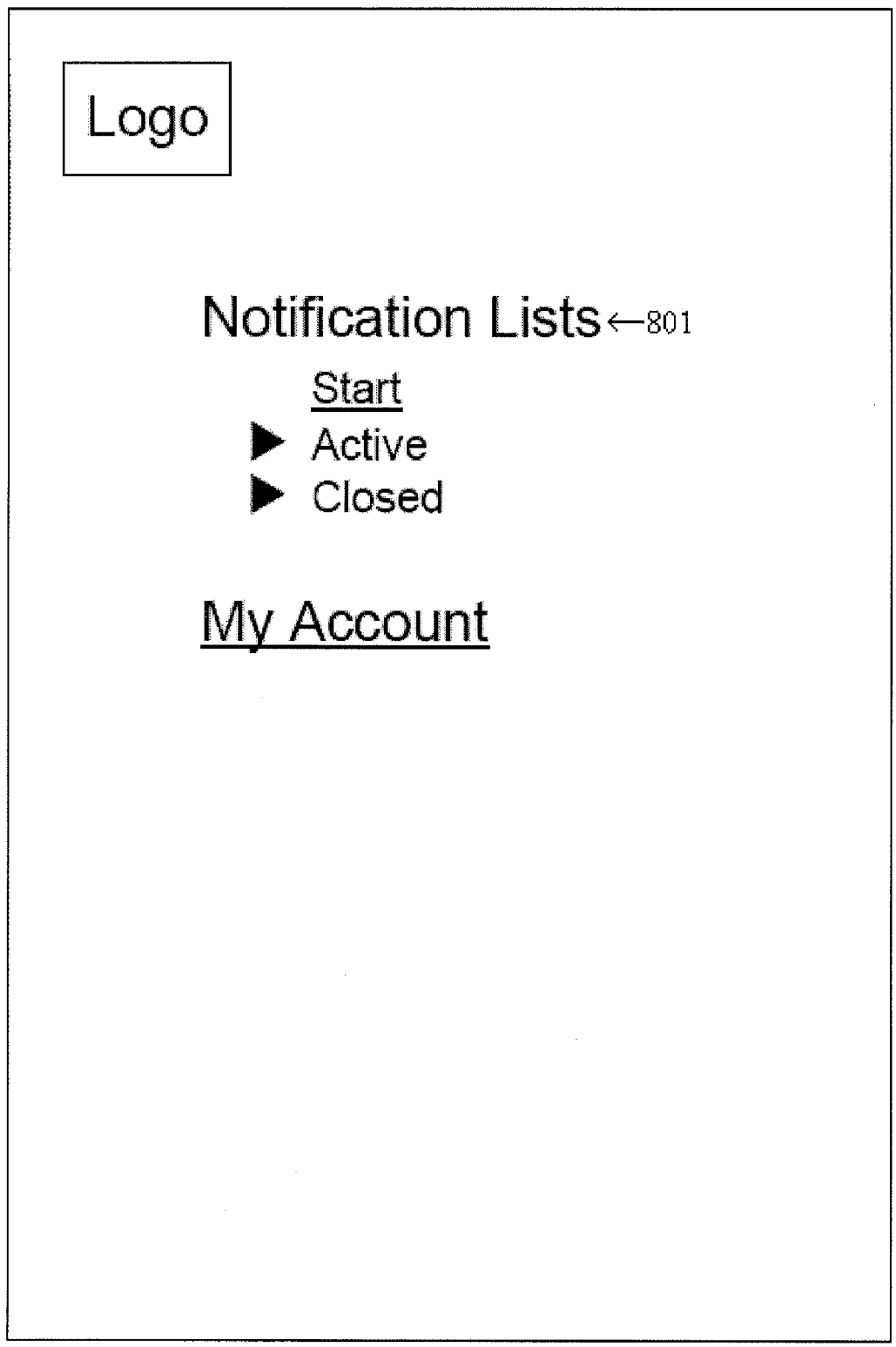
FIG. 8 depicts an exemplary interface which could be presented to consumers.

In addition to (or as an alternative to) a private section for property managers such as discussed above, there could also be a consumer private section, which could provide consumers access through a login protected consumer home page [128], an example of which is provided in FIG. 8. The consumer private section may provide access to a Notification List page [325] (e.g., through a notification list link [801] on a consumer home page [128]) which can be configured to allow the user to perform activities such as: view a list of active Notification Lists [326]; pay for new or pending Notification Lists (e.g., in response to an invitation from a property manager), view a list of closed Notification Lists [328] and/or pay to re-open closed Notification Lists (e.g., following a decline notice from one of the notified managers). A consumer's private section might also be implemented to provide access to an account page [329] which could be used by the consumer to manage his or her personal information that will be sent to property managers [330] and/or preferences [331] (e.g., whether to perform a notification as described, or to see which property managers show interest and then decide which individual manager to provide with further information; if the consumer has a co-applicant; information entered with initial account creation, etc).

Further, in some implementations, there could be a private section for an admin, in addition to (or as an alternative to) private sections for the consumers and property managers. As shown in FIG. 4, an admin private section could include pages such as: a system account management page [333], which could provide access to both consumer [334] and property manager [335] accounts; a customer service chat (or other interface) page [336]; a site settings page [337] (e.g., where admins with sufficient permissions could view and/or modify data such as dollar amounts for each service, dynamic text within the site including alerts to users, and account information for the links to the credit agencies); and an FCRA page [339]. Additionally, those pages could themselves provide access to other pages or information for an admin. For example, an FCRA page [339] could provide access to an FCRA Phase I Inbox [340] (which could be used to store and review FCRA Phase I faxes); a Phase II inbox [341] (which could be used to store and review FCRA Phase II inspection reports); and a Phase II queue [343] (which could be used to assign Phase II inspections to FCRs, perhaps through a separate page or dedicated tool [344]). Also, in some implementations, an admin might have an account page [338], which could be used by the admin to set his or her account preferences [345].

Figure 6:
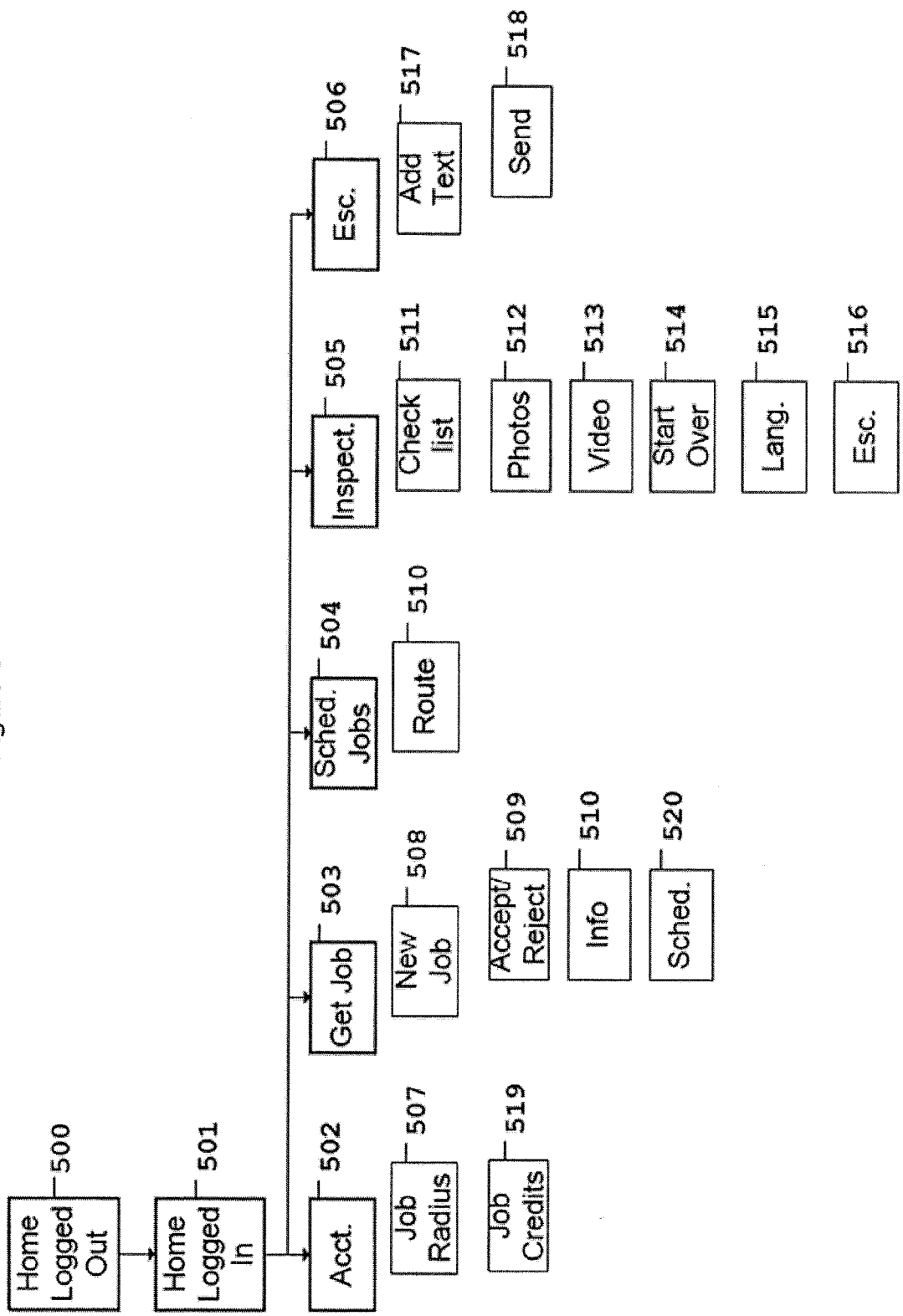
FIG. 6 is a site map of a mobile application which can be used to facilitate allocation and completion of FCRA compliance inspections.

In addition to the approach of using a website as a medium for interactions, it is also possible that some implementations might take other approaches, such as using interfaces provided by dedicated applications. Indeed, in some implementations, such a dedicated application approach could be combined with a website approach, for instance where a dedicated application is provided for use by FCRs on mobile devices. As an example of how such an application could be structured, consider FIG. 6. As shown in FIG. 6, a mobile application can be implemented to provide an interface to an FCR which includes multiple home pages, such as a logged out page [500] and a logged in page [501]. Once an FCR has logged in, additional sections can be presented via the mobile application, such as an account section [502], a get job section [503], a scheduled jobs section [504], an inspection section [505], and an escalation section [506]. In implementations where it is present, an account section [502] can be used by an FCR to set his or her account preferences, such as a preferred job radius [507] and where the FCR can view his or her job credits [519]. Similarly, a get job section [503] could be implemented to allow the FCR to request a new job from the system, display the job information [508], accept or reject a job [509], view directions to an accepted job [510] and/or schedule a job [520] if necessary. A scheduled jobs section could allow the FCR to view scheduled jobs and potentially to view directions to a particular job [510]. An inspection section [505] could be implemented to provide the FCR with the inspection checklist [511], an inspection photo management tool [512], and an inspection video management tool [513]. An inspection section [505] could also be implemented to provide the FCR with a Clear/Start Over tool [514], a method to flag an inspection that requires a non-English translation [515], and an escalation tool [516]. An escalation section [506] could allow the FCR to send a text message (or other appropriate type of message) [517] to an admin, and request that the admin escalate a particular inspection [518] (e.g., in light of a discovery that the inspection requires language skills that the FCR does not possess).

Of course, it should be understood that the discussion above, which focused on tools which could be provided to an FCR through a dedicated application on a mobile device, is not intended to imply that all implementations require the use of dedicated mobile applications for FCRs. For example, in some cases, the functions described with respect to the mobile application could be provided via a website (e.g., one organized according to the structure of FIG. 6) which would be accessed by a FCR via a mobile device. Similarly, the description of the structure and order of activities which could be performed by consumers, property managers, and others should not be treated as implying limits on the potential processes which could be performed, or the systems which could be implemented to support them, based on this disclosure. For example, in some cases, rather than requiring a consumer to pay a fee at the time of indicating interest to property managers on his or her notification list, a consumer might only pay a fee (e.g., to purchase a background check) in the event that a manager indicates an interest in the consumer. In this alternative scenario, the original notifications sent out by consumers might include the same type of anonymized data described above, and the additional data could be purchased to allow property managers to verify the suitability of the consumer as a tenant. Other modifications, such as where costs are paid by property managers, or where costs are shared between parties are also possible. Accordingly, the above disclosure should be understood as being illustrative only, and not limiting.

While the above disclosure was focused on application of the inventor's technology in the context of facilitating rental agreements and regulatory inspection and compliance, it should be understood that the disclosed technology is not limited to being applied in that context, and that it could be beneficially utilized in areas (e.g., performing due diligence in sales or other types of transactions) outside of those explicitly described herein. Accordingly, instead of limiting the protection accorded by this document, or by any document which is related to this document, to the material explicitly disclosed herein, the protection should be understood to be defined by the claims presented in this or any related document, when the terms which are listed below under the label "Explicit Definitions" are given the explicit definitions set forth therein, and the remaining terms are given their broadest reasonable interpretation as shown by a general purpose dictionary. To the extent that the interpretation which would be given to any claims based on the above disclosure is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

EXPLICIT DEFINITIONS

When used in the claims, "based on" should be understood to mean that something is determined at least in part by the thing that it is indicated as being "based on." When something is completely determined by a thing, it will be described as being "based EXCLUSIVELY on" the thing.

When used in the claims, "computer" should be understood to mean a device or group of devices which is capable of performing one or more logical and/or physical operations on data to produce a result.

When used in the claims, "computer readable medium" should be understood to mean any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space.

When used in the claims in the context of configuring a computer, "configure" should be understood to mean providing a computer with specific data (which may include instructions) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

When used in the claims, "data" should be understood to mean information which is represented in a form which is capable of being processed, stored and/or transmitted.

When used in the claims, "database" should be understood to mean a collection of data stored on a computer readable medium in a manner such that the data can be retrieved by a computer. The term "database" can also be used to refer to the computer readable medium itself (e.g., a physical object which stores the data).

When used in the claims, "determine" should be understood to mean the act of generating, selecting or otherwise specifying something. For example, to obtain an output as the result of analysis would be an example of "determining" that output. As a second example, to choose a response from a list of possible responses would be a method of "determining" a response.

When used in the claims, a "set" should be understood to refer to a number, group, or combination of zero or more things of similar nature, design, or function. When the word "set" is applied to "data" or "information," it should be understood to refer to an identifiable collection of "data" or "information."

I claim:

1. A system comprising:
   one or more computers;
   one or more memory connected to the one or more computers, wherein the one or more memory is configured to cause the one or more computers to perform the following steps:
   receive a request to purchase a set of background information for a consumer;

receive a first set of vacancies identified by the consumer;

determine a first set of property managers associated with the first set of vacancies;

generate an invitation for each property manger in the first set of property managers to view the set of background information;

in response to receiving a request, from a property manager in the first set of property managers, to view the set of background information, determining whether inspection materials associated with a physical site of the property manager are complete and whether the set of background information is accessible;

if the inspection materials are complete and the set of background information is accessible, providing the set of background information to the property manager;

if the set of background information is not accessible, presenting an interface operable to allow the property manager to invite the consumer to repurchase the set of background information.

2. The system of claim 1, wherein the one or more memory is configured to cause the one or more computers to receive the request to purchase the set of background information for the consumer prior to receiving the first set of vacancies.

3. The system of claim 1, wherein receiving the first set of vacancies identified by the consumer comprises importing a set of shopping cart data from an internet listing service.

4. The system of claim 1, wherein the steps further comprise, after generating an invitation for each property manager in the first set of property managers:
   a) receiving a second set of vacancies identified by the consumer;
   b) generating a second set of notifications;
      i) wherein the second set of notifications is automatically generated based on the second set of vacancies;
      ii) wherein the second set of notifications comprises a notification for each property manager associated with a vacancy from the second set of vacancies;
      iii) wherein each notification from the second set of notifications comprises an invitation to view the set of background information;
   c) sending the second set of notifications;
      i) wherein each property manager associated with a vacancy from the second set of vacancies is sent a notification based on a single action by the consumer.

5. The system of claim 1, further comprising a database, wherein the steps further comprise:
   a) receiving a tenancy rejection;
      i) wherein the tenancy rejection is received from the property manager;
      ii) wherein the tenancy rejection indicates the property manager is not interested allowing the consumer to rent a vacancy associated with the property manager;
   b) based on receiving the tenancy rejection, generating a lead message for a second property manager;
      i) wherein the lead message indicates compatibility between the consumer and a vacancy associated with the second property manager;
   c) sending the lead message to the second property manager.

6. A method comprising:

receiving a request to purchase a set of background information for a consumer;

receiving a first set of vacancies identified by the consumer;

determining a first set of property managers associated with the first set of vacancies;

generating an invitation for each property manger in the first set of property managers to view the set of background information;

receiving a request from a property manager in the first set of property managers to view the set of background information;

in response to receiving the request to view the set of background information, determining whether inspection materials associated with a physical site of the property manager are complete and whether the set of background information is accessible;

if the inspection materials are complete and the set of background information is accessible, providing the set of background information to the property manager;

if the inspection materials are not complete, transmitting a message to an operator of a mobile device to perform a physical site inspection;

if the set of background information is not accessible, presenting an interface operable to allow the property manager to invite the consumer to repurchase the set of background information;

wherein the steps above are performed using a computer processor.

7. The method of claim 6, wherein the step of receiving the request to purchase the set of background information for the consumer takes place prior to receiving the first set of vacancies.

8. The method of claim 6, wherein receiving the first set of rental vacancies identified by the consumer comprises importing a set of shopping cart data from an internet listing service.

9. The method of claim 6, wherein the method further comprises, after generating an invitation for each property manager in the first set of property managers:
   a) receiving a second set of vacancies identified by the consumer;
   b) generating a second set of notifications;
      i) wherein the second set of notifications is automatically generated based on the second set of vacancies;
      ii) wherein the second set of notifications comprises a notification for each property manager associated with a vacancy from the second set of vacancies;
      iii) wherein each notification from the second set of notifications comprises an invitation to view the set of background information;
   c) sending the second set of notifications;
      i) wherein each property manager associated with a vacancy from the second set of vacancies is sent a notification based on a single action by the consumer.

10. The method of claim 6, further comprising:
   a) receiving a tenancy rejection;
      i) wherein the tenancy rejection is received from the property manager;
      ii) wherein the tenancy rejection indicates the property manager is not interested allowing the consumer to rent a vacancy associated with the property manager;
   b) based on receiving the tenancy rejection, generating a lead message for a second property manager;
      i) wherein the lead message indicates compatibility between the consumer and a vacancy associated with the second property manager;
   c) sending the lead message to the second property manager.

11. A non-transitory computer readable medium comprising instructions which when executed by a computer processor cause the computer processor to perform the following steps:
- receive a request to purchase a set of background information for a consumer;
- receive a first set of vacancies identified by the consumer;
- determine a first set of property managers associated with the first set of vacancies;
- generate an invitation for each property manger in the first set of property managers to view the set of background information;
- in response to receiving a request, from a property manager in the first set of property managers, to view the set of background information, determining whether inspection materials associated with a physical site of the property manager are complete and whether the set of background information is accessible;
- if the inspection materials are complete and the set of background information is accessible, providing the set of background information to the property manager;
- if the set of background information is not accessible, presenting an interface operable to allow the property manager to invite the consumer to repurchase the set of background information.

12. The non-transitory computer readable medium of claim 11, wherein the instructions, when executed by the computer processor, cause the computer processor to receive the request to purchase the set of background information for the consumer prior to receiving the first set of vacancies.

13. The non-transitory computer readable medium of claim 11, wherein receiving the first set of vacancies identified by the consumer comprises importing a set of shopping cart data from an internet listing service.

14. The non-transitory computer readable medium of claim 11, wherein the instructions, when executed by the computer processor, cause the computer processor to further perform the steps of:
- a) receiving a second set of vacancies identified by the consumer;
- b) generating a second set of notifications;
  - i) wherein the second set of notifications is automatically generated based on the second set of vacancies;
  - ii) wherein the second set of notifications comprises a notification for each property manager associated with a vacancy from the second set of vacancies;
  - iii) wherein each notification from the second set of notifications comprises an invitation to view the set of background information;
- c) sending the second set of notifications;
  - i) wherein each property manager associated with a vacancy from the second set of vacancies is sent a notification based on a single action by the consumer.

15. The non-transitory computer readable medium of claim 11, wherein the instructions, when executed by the computer processor, cause the computer processor to further perform the steps of:
- a) receiving a tenancy rejection;
  - i) wherein the tenancy rejection is received from the property manager;
  - ii) wherein the tenancy rejection indicates the property manager is not interested allowing the consumer to rent a vacancy associated with the property manager;
- b) based on receiving the tenancy rejection, generating a lead message for a second property manager;
  - i) wherein the lead message indicates compatibility between the consumer and a vacancy associated with the second property manager;
- c) sending the lead message to the second property manager.

* * * * *

UNITED STATES PATENT AND TRADEMARK OFFICE
CERTIFICATE OF CORRECTION

| | | |
|---|---|---|
| PATENT NO. | : 7,881,982 B1 | |
| APPLICATION NO. | : 12/622168 | |
| DATED | : February 1, 2011 | |
| INVENTOR(S) | : Chris Pohl | |

It is certified that error appears in the above-identified patent and that said Letters Patent is hereby corrected as shown below:

Line 20 of column 4 that reads "...interne..." which should be deleted and replaced with "...internet..."

Signed and Sealed this
Twenty-second Day of March, 2011

David J. Kappos
*Director of the United States Patent and Trademark Office*